US005641584A

United States Patent [19]
Andersen et al.

[11] Patent Number: 5,641,584
[45] Date of Patent: *Jun. 24, 1997

[54] HIGHLY INSULATIVE CEMENTITIOUS MATRICES AND METHODS FOR THEIR MANUFACTURE

[75] Inventors: Per Just Andersen; Simon K. Hodson, both of Santa Barbara, Calif.

[73] Assignee: E. Khashoggi Industries, Santa Barbara, Calif.

[*] Notice: The term of this patent shall not extend beyond the expiration date of Pat. No. 5,543,186.

[21] Appl. No.: 411,391

[22] Filed: Mar. 28, 1995

Related U.S. Application Data

[63] Continuation of Ser. No. 27,404, Mar. 8, 1993, abandoned, which is a continuation-in-part of Ser. No. 929,898, Aug. 11, 1992, abandoned, and Ser. No. 982,383, Nov. 25, 1992, abandoned.

[51] Int. Cl.⁶ .......................... B32B 13/00; C04B 14/00
[52] U.S. Cl. .............. 428/703; 52/309.15; 52/309.17; 106/675; 106/698; 106/713; 106/805; 428/70; 428/220; 428/294.7; 428/312.4
[58] Field of Search .................. 428/34.5, 36.5, 428/312.4, 703, 70, 220, 292; 106/675, 698, 713, 805, DIG. 2; 52/309.15, 309.17

[56] References Cited

U.S. PATENT DOCUMENTS

| | | |
|---|---|---|
| 109,669 | 11/1870 | Rowland. |
| 128,980 | 7/1872 | Rowland. |
| 591,168 | 10/1897 | Heinzerling. |
| 882,538 | 3/1908 | Sargent. |
| 1,223,834 | 4/1917 | Sanger. |
| 1,234,692 | 7/1917 | Poznanski. |
| 1,954,117 | 4/1934 | Caldwell. |
| 1,965,538 | 7/1934 | Stewart. |
| 2,045,099 | 6/1936 | Pond. |
| 2,170,102 | 8/1939 | Thompson. |
| 2,205,735 | 6/1940 | Scherer. |
| 2,307,629 | 1/1943 | MacIldowie. |
| 2,432,971 | 12/1947 | Ruthman et al.. |
| 2,496,895 | 2/1950 | Staley. |
| 2,549,507 | 4/1951 | Morgan et al.. |
| 2,629,667 | 2/1953 | Kaveler. |
| 2,700,615 | 1/1955 | Heismer. |
| 2,793,957 | 5/1957 | Mangold et al.. |
| 2,820,713 | 1/1958 | Wagner. |
| 2,837,435 | 6/1958 | Miller et al.. |
| 2,959,489 | 11/1960 | Wagner. |
| 3,006,615 | 10/1961 | Mason, Jr.. |
| 3,027,266 | 3/1962 | Wikne. |
| 3,030,258 | 4/1962 | Wagner. |
| 3,042,578 | 7/1962 | Denning. |
| 3,052,595 | 9/1962 | Pye. |
| 3,117,014 | 1/1964 | Klug. |
| 3,149,986 | 9/1964 | Zelmanoff. |
| 3,169,877 | 2/1965 | Bartoli et al.. |
| 3,215,549 | 11/1965 | Ericson. |
| 3,305,613 | 2/1967 | Spence. |
| 3,306,961 | 2/1967 | Spence. |
| 3,356,779 | 12/1967 | Schulze. |
| 3,393,261 | 7/1968 | Herzig et al.. |
| 3,403,205 | 9/1968 | Ottenholm. |
| 3,432,317 | 3/1969 | Kelly et al.. |
| 3,459,632 | 8/1969 | Caldwell et al.. |
| 3,468,993 | 9/1969 | Bierlich. |
| 3,470,005 | 9/1969 | Flachsenberg et al.. |
| 3,492,385 | 1/1970 | Simunic. |
| 3,520,707 | 7/1970 | Steinberg et al.. |
| 3,526,172 | 9/1970 | Stuart. |
| 3,558,070 | 1/1971 | Gabriels. |
| 3,579,366 | 5/1971 | Rehmar. |
| 3,683,760 | 8/1972 | Silva. |
| 3,689,294 | 9/1972 | Brannauer. |
| 3,697,366 | 10/1972 | Harlock et al. .................. 428/703 |
| 3,745,891 | 7/1973 | Bodendoerfer. |
| 3,753,749 | 8/1973 | Nutt. |
| 3,754,954 | 8/1973 | Gabriel et al.. |
| 3,759,729 | 9/1973 | Fahn. |

(List continued on next page.)

FOREIGN PATENT DOCUMENTS

| 237557 | 8/1988 | Argentina. |
|---|---|---|
| 241782A1 | 12/1992 | Argentina. |

(List continued on next page.)

OTHER PUBLICATIONS

Andersen, Per Just, "Tailoring of Concrete Materials," *R&H Annual Review*, 1988.

Finn, Strabo et al. "Ekstrudering Af Fiberbeton" Byggeteknik Teknologisk Institut. TR–projeckt nr. 19850133/ 177–85538 *English Translation*—Strabo, Finn, et al. Extrusion of Fiber Concrete, Danish Technological Institute, Department of Building Technology, Oct. 1987.

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Insulation barriers incorporating a cementitious structural matrix formed from a cementitious mixture including a hydraulic cement and water. The insulation barriers are manufactured from cementitious materials in order to be lightweight, insulative, less expensive, and more environmentally compatible than those currently used; they may augment, and even take the place of, traditional insulation materials including insulations made of glass fibers, polyurethane foam, urea-formaldehyde foam, polystyrene, wood fiber, cellulose fiber, rock-wool, etc. The cementitious structural matrix of the insulation barriers usually includes a hydraulic cement paste (formed from the reaction of water with, e.g., a portland-type cement) in combination with a rheology-modifying agent, such as methylhydroxyethylcellulose, and a lightweight aggregate material, which lowers the density of the insulation barrier and increases its insulation ability. Fibrous materials may be incorporated into the cementitious mixture to increase the strength of the final product, while a discontinuous phase of nonagglomerated voids may be incorporated into the cementitious structural matrix to decrease the density and increase the insulation ability of the final product.

107 Claims, No Drawings

U.S. PATENT DOCUMENTS

| | | |
|---|---|---|
| 3,770,859 | 11/1973 | Bevan . |
| 3,773,700 | 11/1973 | Eash et al. . |
| 3,806,571 | 4/1974 | Ronnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,954,490 | 5/1976 | Cockram . |
| 3,968,004 | 7/1976 | Coffey et al. . |
| 3,979,217 | 9/1976 | Sutton . |
| 3,989,534 | 11/1976 | Plungian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits . |
| 4,040,851 | 8/1977 | Ziegler . |
| 4,043,862 | 8/1977 | Roberts . |
| 4,046,584 | 9/1977 | Snyder et al. . |
| 4,053,346 | 10/1977 | Amberg et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,077,809 | 3/1978 | Plunguian et al. . |
| 4,084,980 | 4/1978 | Motoki . |
| 4,085,001 | 4/1978 | Fukuwatari . |
| 4,093,690 | 6/1978 | Murray . |
| 4,115,135 | 9/1978 | Geoman . |
| 4,117,059 | 9/1978 | Murray . |
| 4,117,060 | 9/1978 | Murray . |
| 4,121,402 | 10/1978 | Cress et al. . |
| 4,132,555 | 1/1979 | Barrable . |
| 4,133,619 | 1/1979 | Wise . |
| 4,135,940 | 1/1979 | Peltier . |
| 4,157,998 | 6/1979 | Berntsson et al. . |
| 4,158,989 | 6/1979 | Barr . |
| 4,159,302 | 6/1979 | Greve et al. . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolon et al. . |
| 4,202,857 | 5/1980 | Lowe . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,229,225 | 10/1980 | Kraszewski et al. . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,305,758 | 12/1981 | Powers et al. . |
| 4,310,996 | 1/1982 | Mulvey et al. . |
| 4,313,997 | 2/1982 | Ruff et al. . |
| 4,326,891 | 4/1982 | Sadler . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,377,440 | 3/1983 | Gasland . |
| 4,378,271 | 3/1983 | Hargreaves et al. . |
| 4,383,862 | 5/1983 | Dyson . |
| 4,406,703 | 9/1983 | Guthrie et al. . |
| 4,410,366 | 10/1983 | Birchall et al. . |
| 4,415,366 | 11/1983 | Copening . |
| 4,423,112 | 12/1983 | Luthringshauser et al. . |
| 4,427,610 | 1/1984 | Murray . |
| 4,428,741 | 1/1984 | Westphal . |
| 4,428,775 | 1/1984 | Johnson et al. . |
| 4,444,593 | 4/1984 | Schutz . |
| 4,445,970 | 5/1984 | Post et al. . |
| 4,452,596 | 6/1984 | Clauss et al. . |
| 4,460,348 | 7/1984 | Iioka et al. . |
| 4,462,835 | 7/1984 | Car . |
| 4,481,037 | 11/1984 | Beale et al. . |
| 4,490,130 | 12/1984 | Konzal et al. . |
| 4,497,662 | 2/1985 | Chisholm et al. . |
| 4,504,315 | 3/1985 | Allemann et al. . |
| 4,508,595 | 4/1985 | Gasland . |
| 4,522,772 | 6/1985 | Bevan . |
| 4,524,828 | 6/1985 | Sabins et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,533,393 | 8/1985 | Neuschaeffer et al. . |
| 4,533,581 | 8/1985 | Asaumi et al. . |
| 4,536,173 | 8/1985 | Puls . |
| 4,545,854 | 10/1985 | Gomez et al. . |
| 4,549,930 | 10/1985 | Dessauer . |
| 4,551,384 | 11/1985 | Aston et al. . |
| 4,552,463 | 11/1985 | Hodson . |
| 4,562,218 | 12/1985 | Fornadel et al. . |
| 4,571,233 | 2/1986 | Konzal . |
| 4,581,003 | 4/1986 | Ito et al. . |
| 4,585,486 | 4/1986 | Fujita et al. . |
| 4,588,443 | 5/1986 | Bache . |
| 4,613,627 | 9/1986 | Sherman et al. . |
| 4,619,636 | 10/1986 | Bogren . |
| 4,621,763 | 11/1986 | Brauner . |
| 4,622,026 | 11/1986 | Ito et al. . |
| 4,623,150 | 11/1986 | Moehlman et al. . |
| 4,636,345 | 1/1987 | Jensen et al. . |
| 4,637,860 | 1/1987 | Harper et al. . |
| 4,640,715 | 2/1987 | Heitzmann et al. . |
| 4,642,137 | 2/1987 | Heitzman et al. . |
| 4,650,523 | 3/1987 | Kikuchi et al. . |
| 4,655,981 | 4/1987 | Nielsen . |
| 4,673,438 | 6/1987 | Wittwer et al. . |
| 4,680,023 | 7/1987 | Varano . |
| 4,707,187 | 11/1987 | Tsuda et al. . |
| 4,710,422 | 12/1987 | Fredenucci . |
| 4,746,481 | 5/1988 | Schmidt . |
| 4,749,444 | 6/1988 | Lorz et al. . |
| 4,753,710 | 6/1988 | Langley et al. . |
| 4,754,589 | 7/1988 | Leth . |
| 4,755,494 | 7/1988 | Ruben . |
| 4,772,439 | 9/1988 | Trevino-Gonzalez . |
| 4,784,693 | 11/1988 | Kirkland et al. . |
| 4,786,670 | 11/1988 | Tracy et al. . |
| 4,789,244 | 12/1988 | Dunton et al. . |

| | | | | | |
|---|---|---|---|---|---|
| 4,797,161 | 1/1989 | Kirchmayr et al. | | | |
| 4,799,961 | 1/1989 | Friberg. | | | |
| 4,836,940 | 6/1989 | Alexander. | | | |
| 4,840,672 | 6/1989 | Baes. | | | |
| 4,842,649 | 6/1989 | Heitzman et al. | | | |
| 4,872,913 | 10/1989 | Dunton et al. | | | |
| 4,888,059 | 12/1989 | Yamaguchi et al. | | | |
| 4,889,428 | 12/1989 | Hodson. | | | |
| 4,892,589 | 1/1990 | Kirkland et al. | | | |
| 4,895,598 | 1/1990 | Hedberg et al. | | | |
| 4,912,069 | 3/1990 | Ruben. | | | |
| 4,919,758 | 4/1990 | Wagle et al. | | | |
| 4,921,250 | 5/1990 | Ayres. | | | |
| 4,923,665 | 5/1990 | Andersen et al. | | | |
| 4,925,530 | 5/1990 | Sinclair et al. | | | |
| 4,927,043 | 5/1990 | Vanderlaan. | | | |
| 4,927,573 | 5/1990 | Alpár et al. | | | |
| 4,939,192 | 7/1990 | t'Sas. | | | |
| 4,944,595 | 7/1990 | Hodson. | | | |
| 4,948,429 | 8/1990 | Arfaei. | | | |
| 4,952,278 | 8/1990 | Gregory et al. | | | |
| 4,963,603 | 10/1990 | Felegi, Jr. et al. | | | |
| 4,975,473 | 12/1990 | Kaneda et al. | | | |
| 4,976,131 | 12/1990 | Grims et al. | | | |
| 4,979,992 | 12/1990 | Bache. | | | |
| 4,983,257 | 1/1991 | Schultz et al. | | | |
| 4,985,119 | 1/1991 | Vinson et al. | | | |
| 4,999,056 | 3/1991 | Rasmussen. | | | |
| 5,017,268 | 5/1991 | Clitherow et al. | | | |
| 5,018,379 | 5/1991 | Shirai et al. | | | |
| 5,021,093 | 6/1991 | Beshay. | | | |
| 5,030,282 | 7/1991 | Matsuhashi et al. | | | |
| 5,039,003 | 8/1991 | Gordon et al. | | | |
| 5,039,378 | 8/1991 | Pommier et al. | | | |
| 5,039,560 | 8/1991 | Durgin et al. | | | |
| 5,047,086 | 9/1991 | Hayakawa et al. | | | |
| 5,051,217 | 9/1991 | Alpár et al. | | | |
| 5,061,346 | 10/1991 | Taggart et al. | | | |
| 5,071,512 | 12/1991 | Bixler et al. | | | |
| 5,076,986 | 12/1991 | Delvaux. | | | |
| 5,085,366 | 2/1992 | Durgin et al. | | | |
| 5,085,707 | 2/1992 | Bundy et al. | | | |
| 5,089,198 | 2/1992 | Leach. | | | |
| 5,102,596 | 4/1992 | Lempfer et al. | | | |
| 5,104,487 | 4/1992 | Taggart et al. | | | |
| 5,106,423 | 4/1992 | Clarke. | | | |
| 5,106,880 | 4/1992 | Miller et al. | | | |
| 5,108,677 | 4/1992 | Ayres. | | | |
| 5,108,679 | 4/1992 | Rirsche et al. | | | |
| 5,110,413 | 5/1992 | Steer. | | | |
| 5,122,231 | 6/1992 | Anderson. | | | |
| 5,126,013 | 6/1992 | Wiker et al. | | | |
| 5,126,014 | 6/1992 | Chung. | | | |
| 5,132,155 | 7/1992 | Singh et al. | | | |
| 5,134,179 | 7/1992 | Felegi, Jr. et al. | | | |
| 5,141,797 | 8/1992 | Wheeler. | | | |
| 5,151,130 | 9/1992 | Croft et al. | | | |
| 5,154,771 | 10/1992 | Wada et al. | | | |
| 5,156,718 | 10/1992 | Neubert. | | | |
| 5,160,676 | 11/1992 | Singh et al. | | | |
| 5,167,894 | 12/1992 | Baumgarten. | | | |
| 5,169,566 | 12/1992 | Stucky et al. | | | |
| 5,178,730 | 1/1993 | Bixler et al. | | | |
| 5,184,995 | 2/1993 | Kuchenbecker. | | | |
| 5,221,435 | 6/1993 | Smith, Jr. | | | |
| 5,232,496 | 8/1993 | Jennings et al. | | | |
| 5,240,561 | 8/1993 | Kaliski. | | | |
| 5,269,845 | 12/1993 | Grunau et al. | | | |
| 5,273,821 | 12/1993 | Olson et al. | | | |
| 5,290,355 | 3/1994 | Jakel. | | | |
| 5,338,349 | 8/1994 | Farrar. | | | |
| 5,366,549 | 11/1994 | Imaizumi. | | | |

FOREIGN PATENT DOCUMENTS

| | | |
|---|---|---|
| 241781 | 12/1992 | Argentina. |
| 0263723 A2 | 4/1988 | European Pat. Off. |
| 0290007 A1 | 11/1988 | European Pat. Off. |
| 0340765 | 3/1989 | European Pat. Off. |
| 89107882 | 4/1989 | European Pat. Off. |
| 0340707 | 11/1989 | European Pat. Off. |
| 0497151 A1 | 8/1992 | European Pat. Off. |
| 3011330 | 3/1980 | Germany. |
| 28 41 172 | 4/1980 | Germany. |
| 47-20190 | 9/1972 | Japan. |
| 47-020190 | 9/1972 | Japan. |
| 51-2729 | 1/1976 | Japan. |
| 53-16730 | 2/1978 | Japan. |
| 54-31320 | 3/1979 | Japan. |
| 54-48821 | 3/1979 | Japan. |
| 55-37407 | 3/1980 | Japan. |
| 55-100256 | 7/1980 | Japan. |
| 56-17965 | 2/1981 | Japan. |
| 82-2147 | 1/1982 | Japan. |
| 58-120555 | 7/1983 | Japan. |
| 84-121470 | 6/1984 | Japan. |
| 62-36056 | 8/1985 | Japan. |
| 62-36055 | 8/1985 | Japan. |
| 85-185413 | 8/1985 | Japan. |
| 85-178836 | 8/1985 | Japan. |
| 60-260484 | 12/1985 | Japan. |
| 60-264375 | 12/1985 | Japan. |
| 62-46941 | 2/1987 | Japan. |
| 62-39204 | 2/1987 | Japan. |
| 87-50318 | 3/1987 | Japan. |
| 87-143377 | 6/1987 | Japan. |
| 62-151304 | 7/1987 | Japan. |
| 62-253407 | 11/1987 | Japan. |
| 63-00551 | 1/1988 | Japan. |
| 63-00552 | 1/1988 | Japan. |
| 63-123851 | 5/1988 | Japan. |
| 63-210082 | 8/1988 | Japan. |
| 63-218589 | 9/1988 | Japan. |
| 63-248759 | 10/1988 | Japan. |
| 63-310780 | 12/1988 | Japan. |
| 64-37478 | 2/1989 | Japan. |
| 2-51460 | 2/1990 | Japan. |
| 2-141484 | 5/1990 | Japan. |
| 2-190304 | 7/1990 | Japan. |
| 3-80141 | 4/1991 | Japan. |
| 3-153551 | 7/1991 | Japan. |
| 3-187962 | 8/1991 | Japan. |
| 3-208847 | 9/1991 | Japan. |
| 3-202310 | 9/1991 | Japan. |
| 3-202313 | 9/1991 | Japan. |
| 4-70304 | 3/1992 | Japan. |
| 453555 | 1/1936 | United Kingdom. |
| 490820 | 8/1938 | United Kingdom. |
| 2086748 | 5/1982 | United Kingdom. |
| 2050459 | 6/1983 | United Kingdom. |
| 2192392 | 1/1988 | United Kingdom. |
| 2220934 | 1/1990 | United Kingdom. |
| 2265916 | 10/1993 | United Kingdom. |
| WO87/00828 | 2/1987 | WIPO. |
| WO91/12186 | 8/1991 | WIPO. |
| WO93/20990 | 10/1993 | WIPO. |

OTHER PUBLICATIONS

Finn, Strabo et al. "Nye Formgivningsmetoder Til Fiberbeton" Byggeteknik, Teknologisk Institut *English Translation*—Strabo, Finn, et al. New Design Methods for Fiber Concrete. Technological Institute of Denmark, Department of Building Technology, Apr. 1987.

"Nye Metoder I Beton Kan Betyde Teknisk Knock–Out for Plast" Ingenioren, Saertryk fra nr. 14/86 *English Translation*—New Method for Concrete may mean technical knock–out for plastic. *The Engineer*, No. 14, 1986.

Johansen, Vagn and Per Just Andersen, "Particle Packing and Concrete Properties," *Materials Science of Concrete II*, pp. 111–147.

Ashby, M. F., "Overview No. 80: On the Engineering Properties of Materials," *Acta Metall*, vol. 3, No. 5, pp. 1273–1293 (1989).

Ashby, Michael F., "Materials selection in engineering design," *Indian Journal of Technology*, vol. 28, Jun.–Aug. 1990, pp. 217–225.

Davidson, Robert L. and Marshall Sittig, *Water–Soluble Resins*, New York: Reinhold Publishing Corp., Chapman & Hall, Ltd., London.

"Zien In The Food Industry," *Freeman Industries, Inc.*, P.O. Box 415, Tuckahoe, NY 10707–0415 USA.

Byggeteknik, Teknologisk Institut, Blad No. 1, *Fiberbeton–nyt*, (Oktober 1987) *English Translation*—Department of Building Technology, The Technologocial Institute of Denmark, Pamphlet No. 1, *Fiber Concrete News* (Oct. 1987).

Per Just Andersen, et al., *Tailoring of Cement–Bound Materials by the Use of Packing and Rheological Models*, American Ceramic Society (1988).

Alexanderson, *Self–Smoothing Floors Based on Polymer Cement Concrete*, Concrete International (Jan. 1990).

Algnesberger, *The Use of Anionic Melamine Resin as a Concrete Additive*, Cement Lime and Gravel (Sep. 1973).

Andersen, *Control and Monitoring of Concrete Production—A Study of Particle Packing and Rheology*, The Danish Academy of Technical Sciences (1990).

Andersen, *Effect of Organic Superplasticizing Admixtures and their Components on Zeta Potential and Related Properties of Cement Materials*, Master of Science thesis, Pennsylvania State University (1987).

Andersen, *Effects of W/C–Ratio and Dispersion on the Pore Size Distribution of Cement Paste and Concrete*, Paper prepared for MRL by Per Just Anderson (Aug. 1988).

Andersen, *Rheology of Cement Paste, Mortar and Concrete*, GM Idorn Consultants.

Bache, *Densified Cement/Ultra–Fine Particle–Based Materials*, Presented at the Second International Conference on Superplastcizers in Concrete, in Ottawa, Canada (Jun. 10–12, 1981).

Bailey, *Flexural Strength of Cements*, Nature, vol. 292, 2 (Jul. 1981).

Bardsley, *Form/Fill/Seal, Horizontal, in The Wiley Encyclopedia of Packing Technology*, 364–367 (Marilyin Bakker ed., 1986).

Bemis Company, *Bags, Paper, in The Wiley Encyclopedia of Packaging Technology*, 36–39 (Marilyn Bakker ed., 1986).

Benbow, et al., *The Extrusion Mechanics of Pastes—The Influence of Paste Formulation on Extrusion Parameters*, Chemical Engineering Science, vol. 42, No. 9, 2151–2162 (1987).

Berger, et al., *Acceleration of Hydration of Calcium Silicates by Carbon Dioxide Treatment*, Nature Physical Science, vol. 240 (Nov. 6, 1972).

Blaha, *Ideas in Concrete*, Concrete Products (Sep. 1992).

Bohrer, *Cartons, Folding, in The Wiley Encyclopedia of Packaging Technology*, 146–152 (Marilyn Bakker ed., 1986).

Bousum, *Carriers, Beverage, in The Wiley Encyclopedia of Packaging Technology*, 129–132 (Marilyn Bakker ed., 1986).

Brady et al., *Paper*, Materials Handbook, 588–594, 1991.

Bukowski, et al., *Reactivity and Strength Development of $CO_2$ Activated Non–Hydraulic Calcium Silicates*, Cement and Concrete Research, vol. 9, 57–68 (1979).

Clauson–Kaas, et al., *Ekstrudering af Fiberbeton–delrapport*, Teknologisk Institut, Byggeteknik, TR–Projekt 1985–133/177–85.533 (Dec. 1986) *English Translation*—Clauson–Kaas, et al., *Cement–Based Hybrid Composites*, Technological Institute of Denmark, Department of Building Technology, TR–Project 1985–133/177–85.533 (Dec. 1986).

Clauson–Kaas, *Opsprojtet Glasfiberton i Byggeriet* (1987). (See Statement of Relevance as there is no English translation).

Collepardi, et al., *Combined Effect of Lignosulfate and Carbonate on Pure Portland Clinker Compounds Hydration. I. Tetracalcium Aluminoferrite Hydration*, Cement and Concrete Research, vol. 10, 455–462 (1980).

Collepardi, et al., *Influence of Polymerization of Sulfonated Naphthalene Condensate and its Interaction with Cement*.

Devlin, et al., *Waxes in The Wiley Encyclopedia of Packaging Technology* 697–700 (Marilyn Bakker ed., 1986).

Eriksen et al., *Foam Stability Experiments on Solutions Containing Superplasticizing and air–entraining Agents for Concrete*, The Technological Institute, Department of Building Technology, Taastrup, Denmark.

Eubanks, *Cans, Composite, in The Wiley Encyclopedia of Packaging Technology*, 94–98 (Marilyn Bakker ed., 1986).

Fordos, *Natural or Modified Collulose Fibres as Reinforcement in Cement Composite*, Concrete Technology & Design vol. 5, Natural Fiber Reinforced Cement and Concrete (1988).

Greminger, Jr. et al., *Alkyl and Hydroxyalkylalkylcellulose*, Dow Chemical U.S.A., Midland Oregon.

Gresher, *Carded Packaging, in The Wiley Encyclopedia of Packaging Technology*, 124–129 (Marilyn Bakker ed., 1986).

Hanlon, *Fibre Tubes, Cans, and Drums, in Handbook of Package Engineering*, 7–1 to 7–15 (2d ed. 1984).

Hewlett, *Physico–Chemical Mechanisms of Admixtures Lecture*, CGLI Advanced Concrete Technology Course, Cement and Concrete Association Training Centre (1975).

Hyland, *F–Flute Inches Its Way Into Folding Carton Market*, Paperboard Packaging, at 28–29 (May 1993).

Iler, *The Chemistry of Silica*, 430–432 (1979).

Kaye, *Adhesives, in The Wiley Encyclopedia of Packaging Technology*, 14–16 (Marilyn Bakker ed., 1986).

Klieger, *Studies of the Effect of Entrained Air on the Strength and Durability of Concretes Made with Various Maximum Sizes of Aggregate*, Research and Development Laboratories of the Portland Cement Association (Oct. 1952).

Kline, *Corrugating Operations and Raw Materials in Paper and Paperboard: Manufacturing and Converting Fundamentals*, 184–195 (2d ed. 1991).

Kline, *Packaging in Paper and Paperboard: Manufacturing and Converting Fundamantals*, 196–211 (2d ed. 1991).

Knudsen, *On Particule Size Distribution in Cement Hydration*, Presented to the 7th International Congress on the Chemistry of Cement, Paris (1980).

Kohn, et al., *Cans Fabrication, in The Wiley Encyclopedia of Packaging Technology*, 100–108 (Marilyn Bakker ed., 1986).

Laenger, *Designing an Extruder with Allowance for the Properties of Ceramic Extrusion Compounds–Part 1*, cfi/Ber. DKG 67, No. 4 (1990).

Laenger, *Extruderauslegung unter Berucksichtingung . . . English Translation–Designing an Extruder with Allowance for the Properties of Ceramic . . . Part 2a*, cfi/Ber. DKG 68, No. 9 (1991).

Laenger, *Extruderauslegung unter Berucksichtingung . . . English Translation–Designing an Extruder with Allowance for the Properties of Ceramic . . . Part 2ab*, cfi/Ber. DKG 68, No. 10/11 (1991).

Laenger, *Extruderauslegung unter Berucksichtingung . . . English Translation–Designing an Extruder with Allowance for the Properties of Ceramic . . . Part 3*, cfi/Ber. DKG 69, No. 3 (1992).

Laenger, *Extruderauslegung unter Berucksichtingung . . . English Translation–Designing an Extruder with Allowance for the Properties of Ceramic . . . Part 4*, cfi/Ber. DKG 69, No. 7/8 (1992).

Laenger, *Extruderauslegung unter Berucksichtingung . . . English Translation–Designing an Extruder with Allowance for the Properties of Ceramic . . . Part 4b*, cfi/Ber. DKG 69, No. 9 (1992).

Laenger, *Extruderauslegung unter Berucksichtingung . . . English Translation–Designing an Extruder with Allowance for the Properties of Ceramic . . . Part 5a*, cfi/Ber. DKG 69, No. 10 (1992).

Laenger, *Extruderauslegung unter Berucksichtingung . . . English Translation–Designing an Extruder with Allowance for the Properties of Ceramic . . . Part 5b*, cfi/Ber. DKG 70, No. 3 (1993).

Lavin, *Cans, Composite, Self–manufactured, in The Wiley Encyclopedia of Packaging Technology*, 98–100 (Marilyn Bakker ed., 1986).

Leaversuch, *Blowing Agents: Products MinimizeTradeoffs as CFC Phase–out Takes Effect*, Modern Plastics (1993).

Lentz, *Printing, in The Wiley Encyclopedia of Packaging Technology*, 554–559 (Marilyn Bakker ed., 1986).

Lisiecki, *Cartons, Gabletop, in The Wiley Encyclopedia of Packaging Technology* 152–154 (marilyn Bakker ed., 1986).

Litvan, et al., *Particulate Admixture for Enhanced reeze–Thaw Resistance of Concrete*, Cement and Concrete Research, vol. 8, 53–60, Pergamon Press, Inc. (1978).

Lynch, et al., *Boxes, Rigid–Paperboard, in The Wiley Encyclopedia of Packaging Technology*, 76–79 (Marilyn Bakker ed., 1986).

Manson, et al., *Use of Polymers in Highway Concrete*, National Cooperative Highway Research Program Report 190 (1978).

Maries, *The Activation of Portland Cement by Carbon Dioxide*.

Mass, *Premixed Cement Paste*, Concrete International (Nov. 1989).

Maycock, et al., *Carbonation of Hydrated Calcium Silicates*, Cement and Concrete Research, vol. 4, 69–76 (1974).

Miyake, et al., *Superplasticized Concrete Using Refined Lignosulfate and its Action Mechanism*, Cement and Concrete Research, vol. 15 (1985).

Moyer, *Form/Fill/Seal, Vertical, in The Wiley Encyclopedia of Packaging Technology*, 367–369 (Marilyn Bakker ed., 1986).

Niel, *Supplementary Paper II–117. The Influence of Alkali–Carbonate on the Hydration of Cement* (1968).

Purton, *The Effect of Sand Grading on the Calcium Silicate Brick Reaction*, Cement and Concrete Research vol. 4, 13–29 (1974).

Radek, *Closure Liners, in The Wiley Encyclopedia Packaging Technology*, 171–172 (Marilyn Bakker ed., 1986).

Robinson, *Extrusion Defects*.

Roy, *New Strong Cement Materials: Chemically Bonded Ceramics*, Science, vol. 235, 6 (Feb. 1987).

Satas, *Coating, Equipment, in The Wiley Encyclopedia of Packaging Technology*, 186–191 (Marilyn Bakker ed., 1986).

Sciaudone, *Boxes, Rigid–Pastic, in The Wiley Encyclopedia of Packaging Technology* 78–79 (Marilyn Bakker ed., 1986).

Shah, *Recent Trends in the Science and Technology of Concrete*, NSF Center for Advanced Cement–Based Materials.

Shilstone, Sr., *Mix Temperature and $$$$$*, Concrete Producer News (Oct. 1989).

Shilstone, Sr., *Concrete Mixture Opotimization by Coarseness Factor, Mortar Factor & Particle Distribution*, Concrete International (Dec. 1989).

Shilstone, Sr., *Mixture Optimization for Fast–Track*, Report for American Concrete Institutional Convention, San Diego, CA.

Skalny, et al., *Low Water to Cement Ratio Concretes*, Cement, and Concrete Research, vol. 3, 29–40 (1973).

Soroushian, et al., *Recycling of Wood and Paper in Cementitious Materials*, Mat. Res. Soc. Sypm. Proc., vol. 266 (1992).

Studt, *New Advances Revive Interest in Cement–Based Materials*, R&D Magazine (Nov. 1992).

Sun, et al., *The Composition of Hyrated DSP Cement Pastes*.

Sutherland, *Air–Entrained Concrete*, Cement and Concrete Association, Cement and Concrete Association (1970).

Suzuki, et al., *Formation and Carbonation of C—S—H In Water*, Cement and Concrete Research, vol. 15, 213–224 (1985).

Swec, *Boxes, Corrugated, in The Wiley Encyclopedia of Packaging Technology*, 66–69 (Marilyn Bakker ed., 1986).

Swientek, *Formidable Films*, Prepared Foods, at 118–121 (Sep. 1993).

Verbeck, *Carbonation of Hydrated Portland Cement*, Cement and Concrete Special Technical Publication No. 203 (1958).

Wagner, *Polymer Modification of Portland Cement Systems*, Chemtech (Feb. 1973).

Waldman, *Molded Pulp, in The Wiley Encyclopedia of Packaging Technology*, 559–561 (Marilyn Bakker ed., 1986).

Weiss, et al., *High Tensile Cement Pastes as a Low–Energy Substitute for Metals, Plastics, Ceramics, and Wood. Phase 1: Preliminary Technological Evaluation*, CTL Project CR7851–4330, Final Report, Prepared for U.S. Dept. of Energy (Nov. 1984).

Westman, et al., *The Packing of Particles* (1930).

Young, *Macro–Defect Free Cement: A Review*, Mat. Res. Soc. Symp. Proc., vol. 179 (1991).

Yudenfreund, et al., *Hardened Portland Cement Pastes of Low Porosity. II. Exploratory Studies, Dimensional Changes*, Cement and Concrete Research, vol. 2, 331–348 (1972).

*Cementing the Future: A New Extrusion Technology*, NSF Center for Advanced Cement–Based Materials, vol. 6, No. 1 (Spring 1994).

*Doing More With Less: Optimizing Concrete Mix*, Better Roads (Aug. 1990).

*Flexible Packages*, in *Modern Packaging Encyclopedia and Planning Guide*, 114–126 (Gross et al. eds., 2d ed. 1972).

*Labeling and Printing*, in *Modern Packaging Encyclopedia and Planning Guide*, 193–214 (Gross et al., eds., 2d ed. 1972).

*Materials in Modern Packaging Encyclopedia and Planning Guide* 54–113 (Gross et al. eds., 2d ed. 1972).

*Rigid and Semirigid Containers*, in *Modern Packaging Encyclopedia and Planning Guide*, 127–192 (Gross et al. eds., 2d ed. 1972).

*Shipping and Protection*, in *Modern Packaging Encylcopedia and Planning Guide*, 215–240(Gross et al. eds., 2d ed. 1972).

*Space–Age Concrete That May Sub for Steel.*

Nakano et al.., *Cement Compositions Suitable for Extrusion Molding of High–Strength Building Materials*, Chemical Abstracts, vol. 115, p. 314 (1991).

Zukowski and Struble, *Rheology of Cementitious Systems*, MRS Bulletin, Mar. 1993.

Lewis and Kriven, *Microstructure–Property Relationships in Macro–Defect–Free Cement*, MRS Bulletin, Mar. 1993.

Young and Berg, *Introduction to MDF Cement Composites*, ACBM vol. 1, No. 2, Fall 1989.

Balaguru and Kendzulak, *Flexural Behavior of Slurry Infiltrated Fiber Concrete (SIFCON) Made Using Condensed Silica Fume.*

Naaman and Homrich, *Tensile Stress–Strain Properties of SIFCON*, ACI Materials Journal, May–Jun. 1989.

Stix, *Concrete Solutions*, Scientific American, Apr. 1993.

Strabo, *Cementbuserede Hybrldkompositttes*, Byggeteknik Teknologisk Institut, 1987. English Translation—Strabo, Andersen, and Clauson–Kaas, *Cement–Based Hybrid Composites*, 1987.

Strabo et al, *Fiberbeton Teknology.*, Byggeteknik Teknologisk Institut, 1986. English Translation—Strabo, Cluason–Kaas, Chatterji, and Thaulow, *Fiber Concrete Technology TR–Project*, 1986.

Andersen, et al., *Tailoring of Cement–Bound Materials By the Use of Packing and Rheological Models*, American Ceramic Society (1988).

Roy, et al., *Processing of Optimized Cements and concretes via Particle Packing*, Mrs. Bulletin (Mar. 1993).

*Plastic–Forming Processes.*

Knab, Clifton, and Ings, *Effects of Maximum Void Size and Aggregate Characteristics on the Strength of Mortar*, Cement and Concrete Research. vol. 13 pp. 383–390, 1983.

Unwalla and Green, editors, *Recycled Materials for Making Concrete*, The Indian Concrete Journal, vol. 53, No. 9, Sep. 1979.

Rosenberg and Gaidis, *A New Mineral Admixture for High–Strength Concrete–Proposed Mechanism for Strength Enhancement*, Second International Conference on the Use of Fly Ash, Silica Fume, Slag and Natural Pozzolans in Concrete, Apr. 21–25, 1986.

Brown, Ledbetter, and Jennings, *An Investigation of a High Speed Shear Mixer on Selected Pastes and Mortars*, Mat. Res. Soc. Symp. Proc vol. 137, 1989.

*The Colcrete Process*, Undated Publication.

*The Coating Process for Paper*, 1993.

*Report of the Panel on Solids Processing.*

Lawrence, *The Properties of Cement Paste Compacted Under High Pressure: Research Report 19*, Cement and Concrete Association Research Report 19, Jun. 1969.

Jones and Berard, *Raw Materials Processing*, Ceramics: Industrial Processing and Testing, Iowa State University Press, 1972.

Hlavac, *The Technology of Glass and Ceramics*, Glass Science and Technology, 4: The Technology of Glass and Ceramics, Elsevier Publishing, 1983.

Skalny and Bajza, *Properties of Cement Pastes Prepared by High Pressure Compaction*, ACI Journal, Mar. 1970.

Bach, *Cement–Based Products Processed the Plastics Way.*

Lecznar and Barnoff, *Strength of Neat Cement Pastes Molded Under Pressure*, Journal of the American Concrete Institute Concrete Briefs, Feb. 1961.

Roy, Gouda, and Bobrowsky, *Very High Strength Cement Pastes Prepared by Hot Pressing and Other High Pressure Techniques*, Cement and Concrete Research, vol. 2, pp. 349–366, 1972.

B. W. Attwood, *Paperboard, The Wiley Encyclopedia of Packaging Technology* 500–506 (Marilyn Bakker ed., 1986).

G. A. Baum, et al., *Paper, Kirk–Othmer Concise Encyclopedia of Chemical Technology* 834–836 (Martin Grayson ed., 1985).

George S. Brady & Henry R. Clauser, *Materials Handbook* 588–594 (1991).

James E. Kline, *Paper and Paperboard Manufacturing and Converting Fundamentals* 19–28 (2d ed. 1982).

Richard J. Lewis, Sr., *Condensed Chemical Dictionary* 870 (12th ed. 1993).

Stearns T. Putnam, et al., *Papermaking Additives, Kirk–Othmer Concise Encyclopedia of Chemical Technology* 836–837 (Martin Grayson ed., 1985).

M. Sikora, *Paper, The Wiley Encyclopedia of Packaging Technology* 497–500 (Marilyn Bakker ed., 1986).

Vrana, *Khashoggi Kin Reported Planning Private Placement of Shares in New Container Firm*, 1993.

Samuel Ferretti, MRS *Distributed Reinforcement Concrete Pipes: An Innocative Product* 44–48 (May 1993).

Dow Plastics, *Thermoforming Process Guide.*

Bajza, *On The Factors Influencing the Strength of Cement Compacts*, Cement and Concrete Research, vol. 2, pp. 67–78, 1972.

HIGHLY INSULATIVE CEMENTITIOUS MATRICES AND METHODS FOR THEIR MANUFACTURE this application is a continuation of U.S. Ser. No. 08/027,404, filed Mar. 8, 1993, now abandoned, which is a continuation-in-part of U.S. Ser. No. 07/929,898, filed Aug. 11, 1992, now abandoned, and a continuation in-part of U.S. Ser. No. 07/982,383, filed Nov. 25, 1992, now abandoned.

BACKGROUND OF THE INVENTION

1. The Field of the Invention

The present invention relates to cementitious insulation materials which can be used anywhere insulation may be needed. More particularly, the present invention is directed to insulative barriers which have a structural matrix formed from a cementitious mixture, including various aggregates and other materials, and which are inexpensive and more environmentally neutral than the insulation barriers and materials currently used in the industry.

2. Related Applications

This application is a continuation of U.S. Ser. No. 08/027,404, filed Mar. 8, 1993, now abandoned, which is a continuation-in-part of co-pending application Serial No. 07/929,898, entitled "Cementitious Food and Beverage storage, Dispensing, and Packaging Containers and the Methods of Manufacturing Same," filed Aug. 11, 1992, in the names of Per Just Andersen, Ph.D. and Simon K. Hodson (now abandoned). U.S. Ser. No. 08/027,404 is also a continuation-in-part of co-pending application Ser. No. 07/982,383, entitled "Food and Beverage Containers Made From Inorganic Aggregates and Polysaccharide, Protein, or Synthetic Organic Binders, and the Methods of Manufacturing Such Containers," filed Nov. 25, 1992, in the names of Per Just Andersen, Ph.D. and Simon K. Hodson (now abandoned) which is a continuation-in-part of co-pending application Ser. No. 07/929,898, set forth above. For purposes of disclosure, each of these applications is incorporated herein by specific reference.

3. Relevant Technology

From the beginning, man has labored against nature in his struggle to survive. Man has worked especially hard in the fight to stay warm—first by discovering that skins of beasts provided protection from the cold, and then by discovering that his dwelling place could be protected and insulated in like manner. As man built shelters to control his environment, he found that these structures, lean-tos, or huts made of wood, leaves, or reeds were effective as thermal barriers. As man progressed, he discovered that walls made with adobe, stone, or wood, and roofs made from grass or palm leaves, provided increased insulation. Even cork, where available, was used to insulate buildings.

In modern times, as mankind became more sophisticated, a wide variety of largely synthetic materials were developed which proved to be far superior insulators. However, with each step away from natural substances, mankind not only saw incremental improvements in the ability to insulate, but also huge increases in the environmental and health problems caused by various synthetic insulation materials.

A wide variety of inorganic and organic substances have been proven to cause grave health problems in humans, most notably asbestos and urea formaldehyde foam. In addition, many insulating foams used today are blown with chemical solvents known as chlorofluorocarbons (or "CFC's"), which have been implicated as being responsible for recent thinning in the ozone layer. Moreover, the best (i.e., the most insulative per unit of mass) synthetic insulation materials used today are organic foam materials, which tend to be flammable. When these organic foam materials burn, they often release extremely toxic fumes.

Another widely used insulation material, cellulose-based insulation made from shredded paper or other wood pulp products, is also highly flammable. In case of fire, these insulation materials not only will facilitate the incineration of the house or building, but will often expose the occupants of the house or building to deadly, or at least highly toxic, gases. Even fiberglass insulation, which is nonflammable, is often coated with certain organic-based (and flammable) materials to increase its workability. However, not even fiberglass insulations are completely fire resistant.

Generally, there are six basic types of thermal insulation: (1) air film or air layers; (2) closed cellular materials; (3) fibrous materials; (4) flake materials; (5) granular materials; and (6) reflective foils. Many applications may combine one or more of these insulation types.

Air films or air layers generally consist of a single surface, or a plurality of multiple surfaces, between which only air exists. An example of this is the double-paned or storm window. In addition, the simple shutter takes advantage to some degree of the air layer trapped between the shutter and the window being enclosed. Air layers are usually the safest forms of insulation, both from an environmental and health standpoint; the only variable is the material used to encapsulate the air.

Cellular insulation is composed of porous materials containing numerous small voids of air or gas. Generally, this material is of the closed cell variety, in which each cell is separated from the others by cell windows or thin membranes. Traditionally, cellular insulation has been produced from glass, plastics, and rubber. Common generic thermal insulations of this type are cellular glass, expanded elastomeric foam, polystyrene foam, polyisocyanate and polyurethane foams, and urea-formaldehyde foam. Except for cellular glass, these other forms of insulation are flammable and release toxic (and even deadly) fumes when ignited.

In addition, urea-formaldehyde foam insulation ("UFFI"), which became very popular in the 1970's during the energy crisis because of the ease in which it could be used to retrofit houses and buildings, has recently been implicated as causing numerous illnesses and respiratory problems. One notable and dangerous problem is that UFFI is known to release substantial quantities of formaldehyde over time.

Formaldehyde can be very toxic to humans, is irritating to mucous membranes, and is thought to be carcinogenic according to some experts. It is the major constituent of embalming fluid. Epidemiologic evidence indicates that adverse health effects associated with residential exposure to formaldehyde cover a wide range of signs and symptoms, including neurophysiological effects, eye and skin irritations, upper and lower respiratory irritations, pulmonary edema, and headaches. Rats exposed to only 15 ppm of formaldehyde developed squamous cell carcinoma in the nasal cavity.

As a result of the dangers relating to human exposure to UFFI, Canada and several states in the United States have banned the use of UFFI. Estimates of the number of homes insulated with UFFI are about 500,000 in the United States and about 100,000 in Canada.

Fibrous insulation is comprised of many small diameter fibers intertwined together to generally form open cell pockets of air between the bundles of fibers. These fibers can consist of organic materials such as hair, wood, and cane, or may be made from synthetic materials such as glass, rock wool, slag wool, aluminum silicate, asbestos, and carbon. Like the organic foams above, carbon fiber materials are highly flammable once ignited at high temperature. Except for asbestos, inorganic fibers are generally among the safest insulation materials, although they provide little or no structural support and must contain a shell made from metal foil or plastic in order to have a modicum of structural support.

On the other hand, asbestos, one of the most widely used insulation materials in the past, is proven to cause a number of severe (or fatal) health problems, including asbestosis and lung cancer. In addition, asbestos insulation workers often unwittingly ingest large quantities of asbestos, which has been shown to cause in these workers an increase in the incidence of colon cancer. In a study of 17,800 asbestos insulation workers, instead of 38.1 expected deaths due to cancer of the colon and rectum, there were 59. Seikoff, "Mortality Experience of Insulation Workers in the U.S. and Canada: 1943–1976," 330 *Annals N.Y. Acad. of Sci.* 91–116 (1979); see also Miller, "Asbestos Fiber Dust and Gastrointestinal Malignancies: Review of Literature with Regard to Cause/Effect Relationship," 31 *J. Chronic Disorders* 23–33 (1978).

Flake insulation materials consist of small particles or flakes which may be poured into an air space or bonded together to provide a rigid form of the insulation. Rigid form flake insulation can be used for pipe insulation or for other applications in block or board form. The two types of flake insulation commonly used are perlite and vermiculite. However, unless combined together in some kind of matrix, they are only useful as loose fill insulators.

Granular insulation is composed of small particles which contain voids or hollow spaces. These hollow spaces can transfer air between the individual voids. The parent material can be magnesia, calcium silicate, diatomaceous earth, or vegetable cork. The first three are commonly used as industrial pipe insulations, while cork is used in low temperature refrigeration applications.

Reflective insulation is composed of parallel thin sheets of foil with either high thermal reflectants or low emitants. These thin sheets are spaced to reflect radiant heat back to the source. Each separate sheet provides two heat transfer film coefficients; the air space between two sheets causes a reduction in conduction and convection. Foil insulation is commonly used in specially designed environmental chambers and in high temperature applications where radiative heat transfer is the predominant mode of heat transfer.

Another type of insulation material, more akin to the compositions and structures disclosed herein, is insulating concrete. Insulating and lightweight concretes are presently made by special methods, or by the addition of spongy aggregates. Slag may be used for this purpose. AEROCRETE® of the Aerocrete Corp., is a porous lightweight concrete produced by adding aluminum powder to the hydraulic cement. The aluminum flakes react with lime present within hydraulic cement to form hydrogen bubbles. DUROX® of the U.S. Durox Co., produced as lightweight blocks, panels, and wall units, is a foamed concrete made from a mixture of sand, lime, cement, and gypsum, along with aluminum powder which reacts to produce $3CaO.Al_2O_3$ and free hydrogen in the form of tiny bubbles. The set material contains about 80% cells and has only about ⅓ the weight of ordinary concrete with a compressive strength of 1,000 lb/in² (6 MPa).

However, the insulating properties of the insulative concretes presently on the market are quite small relative to the insulation ability of the materials typically used in the building industry, like glass wool and organic foams. In addition, the available products are still very heavy compared to glass wool and organic foams. Hence, presently manufactured insulating concrete is limited in use and cannot take the place of conventional insulations used in the building industry or in the manufacture of appliances.

Nevertheless, insulating concretes have the advantage of being much safer than most of the insulation materials described above, and are more environmentally benign, since they are essentially comprised of the same components as the earth. In addition, they are fire resistant, nonflammable, and do not emit dangerous or toxic fumes when exposed to fire.

Besides the obvious health hazards of asbestos, UFFI, and ignited organic foams, certain organic foams, such as polystyrene and polyurethane/polyisocyanate foams, also pose grave environmental risks because they require the use of CFC's during their manufacture. They also consume vast amounts of petroleum, an ever diminishing resource, as the parent material.

As stated above, CFC's have been linked to the destruction of the ozone layer because they release chlorine products into the stratosphere. It is mainly due to the stability of CFC's that they do not soon degrade after first being emitted. Thus, they are allowed to migrate upward through the atmosphere until they reach the ozone layer in the stratosphere. Upon disintegration, it is believed that CFC's release chlorine, which is readily converted to chlorine monoxide, which in turn is thought to react with and destroy ozone.

Because the ozone layer acts as a filter to remove most of the harmful ultraviolet (or "UV") wavelengths emitted by the sun, it is believed that significant thinning of the ozone layer may, in the future, cause widespread damage to living organisms through excessive exposure to harmful UV light. In particular, excessive exposure to UV radiation causes sunburning of the skin of humans and animals, in addition to the burning of the retina. There have been numerous studies and reports that have concluded that further breakdown of the ozone layer may lead to sharp increases in skin cancer and cataracts in humans.

In the manufacture of foams, including styrofoam (or blown polystyrene), CFC's (which are highly volatile liquids) are used to "puff" or "blow" the polystyrene, which is then molded into the form of various insulating materials, including food and beverage containers. In particular, CFC-12 has been the agent of choice but is among the CFC's that have been slated to be phased out of use by 1996.

In addition to the chemicals used in the manufacture of insulation products, it is often necessary to dispose of used or scrap insulation itself, which most often ends up in municipal landfills. However, none of the traditional insulation materials is biodegradable except for cellulose-based products. Nevertheless, it is well documented that paper-based products (cellulose) persist for decades within landfills and do not decompose.

From the foregoing, it will be understood that what are needed are new forms of insulation which are not harmful, or which do not pose serious health risks, to the installer or the building dweller.

In addition, it would be a significant improvement over the prior art to provide insulation materials and methods for their manufacture which were more environmentally neutral and which do not use ozone-depleting chemicals. It would be a significant advancement to provide insulation materials with insulating properties comparable to asbestos, urea formaldehyde foam, or styrofoam, but which do not contribute to environmental or health problems.

Further, it would be appreciated that the alternative insulation material would be extremely useful if it could be produced at a cost equal to, or even lower than, currently used insulation materials. Further, it would be significant that such insulation materials might, in some cases, be both lightweight and have structural support comparable to typical gypsum board.

From a manufacturing perspective, it would be a significant advancement in the art to provide insulation barriers which can be rapidly formed while maintaining their shape without external support so that the barriers can be handled using conventional manufacturing techniques.

From a safety standpoint, it would be a substantial improvement over the prior art to provide insulation materials which were not only flame retardant, but that were completely nonflammable. It will be appreciated that it would be a major advancement to provide insulation materials which were not only fire resistant, but which also did not produce chemicals harmful to humans and, particularly, which did not cause lung or colon cancer, or asbestosis of the lungs.

It would be an important advancement if such insulation materials were more readily disposable than current insulation materials used in the construction of buildings, and which had essentially the chemical composition of the earth into which they might eventually be disposed.

Such insulation materials and barriers, along with methods for their manufacture, are disclosed and claimed herein.

BRIEF SUMMARY AND OBJECTS OF THE INVENTION

The present invention encompasses cementitious insulation barriers made from hydraulic cement, water, and appropriate aggregates, along with methods for their manufacture. It has been found that strong, lightweight, and insulative materials can be readily and inexpensively manufactured from cementitious materials through innovative processes developed through a microstructural engineering approach. The cementitious insulation barriers within the scope of the present invention are particularly useful in most applications or areas where insulative materials are now used. They are particularly useful in the construction industry because of their low cost and light weight, both in insulating building walls and for covering heating and cooling ducts therein, as well as with many types of refrigeration equipment.

Hydraulic cement products, and methods of utilizing them, have literally been known for millennia. While many types of cementitious products have been made, these products are similar in that they are extremely bulky and require significant size and mass in order to achieve the desired strength, insulation, and other performance criteria.

While some lightweight and somewhat insulative cementitious products have been made, these products have not been able to achieve high strength to mass, or high insulation to mass, ratios at effective and practical costs. In contrast, the cementitious insulation barriers of the present invention are far more insulative, stronger, and versatile than previously known cementitious materials.

The cementitious materials of the present invention were developed from the perspective of microstructural engineering in order to build into the microstructure of the cementitious composition the desired properties while at the same time remaining cognizant of costs and manufacturing complications. This microstructural engineering analysis approach, instead of the traditional trial-and-error, mix and test approach, has resulted in the ability to design cementitious materials that have high strength, high insulation, low weight, and low cost, and which are environmentally neutral as required by today's environmentally conscious society.

The preferred cementitious structural matrix of the insulation barriers of the present invention includes a hydraulic cement paste (formed from, e.g., a portland-type cement and water) in combination with a rheology-modifying agent (sometimes referred to herein as a "plasticizer"), such as methylhydroxyethylcellulose. Other preferred embodiments further include various aggregate materials (like perlite, vermiculite, hollow glass spheres, or aerogels), fibrous materials (like cellulose or glass fibers), and air voids. These work together to give the necessary strength and insulative properties at a cost which is economically justified from a commercial prospective.

The preferred methods of manufacturing cementitious insulation barriers within the scope of the present invention include the steps of (1) mixing a powdered hydraulic cement and water in order to form a cement paste; (2) combining a rheology-modifying agent (such as methylhydroxyethylcellulose) with the cement paste such that the resultant cementitious mixture develops a more plastic-like rheology; (3) adding an aggregate material and/or entrained air to the cementitious mixture in order to impart the desired lightweight properties to the mixture; (4) adding a fibrous material (such as abaca, glass, plastic, or metal fiber) which preferably has a high aspect (length to width) ratio, to the cementitious mixture in order to increase toughness and strength; (5) molding the cementitious mixture into an insulation barrier of a predetermined shape; and (6) allowing the cementitious mixture to harden or cure into the predetermined shape. In order to incorporate significant amounts of entrained air within the cementitious mixture it is usually necessary to add an air entraining agent such as a surfactant, as well as a stabilizing agent to stabilize the foamed product such as $CO_2$.

In certain embodiments of the present invention, it may be desirable to sandwich, or otherwise join together, cementitious materials with varying compositions in order to maximize both the insulative ability and strength of the resulting insulation barrier. For instance, cementitious materials of the present invention that have large amounts of entrained air and/or lightweight aggregates, will typically be both lightweight and highly insulative, but will lack adequate strength for some insulation applications. On the other hand, cementitious materials of the present invention which have little or no entrained air and/or lightweight aggregates, but which have fibers and/or relatively dense aggregates, are not particularly lightweight nor are they as insulative, but have superior strength properties. A combination of these two types of materials yields a highly insulative barrier with superior strength. In addition, the supporting material can be a noncementitious layer made from plastic, metal foil, paper, fiberglass or composite fabric, wood, wood pulp, or any other appropriate supporting material known in the art.

In some instances, where there are one or more layers comprised of higher density, higher strength concrete, the low density, highly insulative material can be a foamed material made with a non-hydraulic cement binder, such as a hydroxyalkylcellulose product. In addition, it may be a single-component, lightweight, insulative material such as aerogel or sea gel.

Where it is desired that the cementitious material contain air voids, such voids can be incorporated through various techniques into the cementitious mixture—one method being the mechanical incorporation of air voids during the mixing process (preferably by means of a high speed, high shear energy mixer), and another being the generation and incorporation of gas into the cement paste in situ by chemical means (such as adding a metal that is readily oxidized in the basic cement paste to yield a gas).

As stated above, the compositions of the present invention can be varied to yield products (or constituent portions of products) of substantially different character. For example, very lightweight insulation products (similar in weight and consistency to styrofoam), or constituent parts thereof, can be manufactured. For convenience, this first type of insulation product is sometimes herein referred to as a "foam-type" product.

Alternatively, products that are more rigid, durable and strong, and which have an appearance more like that of a pottery or ceramic product, can be made according to the present invention. However, even the most durable products of the present invention are much lighter than either ceramic or pottery, and typically have a bulk specific gravity less than 2.0 g/cm$^3$, whereas pottery or ceramic products typically have a bulk specific gravity of 2.0 g/cm$^3$ or greater. This second type of product of the present invention is sometimes herein referred to as a "clay-type" product. In addition, a hybrid "foam-clay" product is also possible.

A key feature of the microstructural engineering design of the present invention is the cost and property optimization of each of the component materials. Further, in many of the preferred embodiments, the mixing of the cement paste is performed under high shear energy conditions in order to create a substantially homogeneous cementitious mixture of all of the components. This greatly increases the strength of the resulting cementitious matrix, while also allowing the entrainment of nonagglomerated air to reduce the specific gravity (and increase the insulative ability) where desired. It should be understood that the action of high speed, high shear mixing greatly increases the surface area of the cementitious mixture, thereby aiding in the entrainment of air.

However, high speed, high shear mixing is generally not appropriate when mixing low density aggregates into the cementitious mixture. Such high speed mixing tends to break up and pulverize the lightweight aggregates, thus destroying their lightweight attributes. Instead, after all of the other components have first been mixed under high energy conditions lightweight aggregates may then be mixed into the cementitious mixture using low speed, low shear mixing. Nevertheless, it should be understood that heavier aggregates, such as sand, which will not break apart can also be mixed under high shear mixing conditions.

While entraining air is often desirable, it is also possible to incorporate a number of inexpensive gases within the cementitious mixture during high speed mixing. One currently preferred gas is carbon dioxide since it can react with the components of the hydraulic cement paste to increase both the form stability and the "foam stability" of the cementitious mixture. Other factors, such as raising the pH and the concentration(s) of alkali metal ions such as sodium and potassium ions increase both the rate and amount of $CO_2$ dissolution within the aqueous layer.

Increasing the form stability and causing early false setting both decrease the cost of manufacture because they allow the molded cementitious material to be handled within a shorter period of time after the formation of the cementitious mixture into the desired shape.

On the other hand, foam stability, or the tendency of the air voids to remain well dispersed throughout the cementitious mixture, increases both the insulative ability and the strength of the final hardened material.

The molding process can be done by a variety of well-known methods which have historically been applied to plastic materials, including roller casting, high pressure extrusion, ram pressing, hot isostatic pressing, injection molding, and other casting and forming methods, such as simply pouring the materials into a mold. While these methods are known in the art in connection with plastics and some ceramic and metal powdered materials, it is only because of the unique microstructural engineering of the present invention that the cementitious mixtures of certain embodiments can be molded into a product such as a cementitious insulation barrier and still maintain their shape without external support while in the green state.

Indeed, the economic viability of insulation barriers from cementitious materials is primarily possible because the cementitious mixture is fairly self-supporting during the green state and can maintain its molded or cast state throughout the curing process where needed. In addition, the compositions of the present invention importantly provide a cementitious mixture that can rapidly reach a sufficiently high strength so that the molded insulation barriers can be handled and manipulated using conventional means.

Of course, in some applications, such as where a foamed, fluid cementitious mixture is injected into a space (e.g., between the inner and outer walls of a building or into a mold), it may be desirable for the cement paste to flow while in the green state. That is the advantage of the microstructural engineering design approach of the present invention; the desired properties and characteristics can be "built" into the desired product.

From the foregoing, it will be appreciated that an object of the present invention is the development of cementitious insulation barriers which do not require the use of environmentally damaging manufacturing methods and raw materials. It will also be appreciated that the insulation barriers of the present invention pose no significant health hazard to the manufacturing technician, installer, or end user (building dweller). Nor do they require large amounts of quickly depleting petroleum resources to supply the necessary parent materials, but are made from materials drawn from the earth.

Further, another object and feature of the present invention is the development of cementitious insulation barriers which are more environmentally neutral, both in their manufacture and their disposal, than currently used insulation materials.

A still further object and feature of the present invention is the development of cementitious insulation barriers which have the insulating properties of materials such as styrofoam or other organic foams without the disadvantages thereof. One object of the present invention is the development of cementitious insulation barriers which do not release hazardous chemicals like formaldehyde, pentane, and CFC's into the air.

Another object and feature of the present invention is the development of cementitious insulation barriers which are lightweight and yet have a high strength to bulk density ratio to give sufficient structural support for the insulation barrier.

Still another object and feature of the present invention is the development of cementitious insulation barriers which can be produced inexpensively at costs that are comparable to or lower than existing products.

A still further object and feature of the present invention is the development of cementitious insulation barriers which can maintain their shape without external support during the green state and which rapidly achieve sufficient strength so that the molded barriers can be handled using conventional means.

Another object and feature of the present invention is the development of cementitious insulation materials which are nonflammable and which do not emit toxic or deadly fumes when exposed to fire.

Finally, another object and feature of the present invention is the development of cementitious insulation materials which essentially have the same chemical composition as the earth into which they will eventually be disposed.

These and other objects and features of the present invention will become more fully apparent from the following description and appended claims, or may be learned by the practice of the invention.

DETAILED DESCRIPTION OF THE PREFERRED EMBODIMENTS

The present invention relates to insulation barriers for use in most applications where insulation products are presently used, most notably in the construction industry. More particularly, the present invention is directed to insulation barriers manufactured from cementitious materials which are lightweight, have a high strength to bulk density ratio, are insulative, can be produced cost effectively, and are more environmentally neutral than currently used insulation materials which are often toxic or fatal to the manufacturer, installer, or end user (house or building dweller).

As discussed above, the cementitious insulation barriers within the scope of the present invention can be made to have a variety of densities and physical characteristics, or include integral layers of materials with varying densities, strengths, insulation capabilities, toughness, etc. Both "foam-type" and "clay-type" products can be manufactured according to the present invention, depending upon the concentrations and types of the materials used and the molding, casting, or extrusion process utilized. In addition, hybrid "foam-clay" products, or products having separate "foam-type" and "clay-type" constituents, can be made according to the present invention.

I. General Discussion.

A. Microstructural Engineering Design

As mentioned above, the insulation barriers of the present invention have been developed from the perspective of microstructural engineering design in order to build into the microstructure of the cementitious composition certain desired, predetermined properties, while at the same time remaining cognizant of costs and manufacturing complications. This microstructural engineering analysis approach, in contrast to the traditional trial-and-error mix and test approach, has resulted in the ability to design the cementitious materials with those properties of strength, weight, insulation, cost, and environmental concerns that are necessary for appropriate insulation barriers.

The number of different raw materials available to engineer a specific product is enormous, with estimates ranging from between 50,000–80,000. They can be drawn from such disparately broad classes as metals, polymers, elastomers, ceramics, glasses, composites, and hydraulic cements. Within a given class of materials, there is some commonality in properties, processing, and use-patterns. Ceramics, for instance, have high modula, while polymers have low modula; metals can be shaped by casting and forging, while composites require lay-up or special molding techniques; hydraulic cement products are rigid and have high compressive strength, while elastomers are less rigid and highly flexible.

However, this compartmentalization has its dangers; it can lead to specialization (the metallurgist who knows nothing of ceramics) and to conservative thinking ("we use steel because that is what we have always used"). It is this specialization and conservative thinking that has limited the consideration of using cementitious materials for a variety of products, such as in making insulation barriers for home and building construction or in the manufacture of appliances. Nevertheless, once it is realized that cementitious materials have such a wide utility and can be designed and microstructurally engineered, their applicability to a variety of possible products becomes obvious.

The design of the compositions of the present invention has been developed and narrowed, first by primary constraints dictated by the design, and then by seeking the subset of materials which maximize the performance of the components. At all times during the process, however, it is important to realize the necessity of designing products which can be manufactured by a cost-competitive process.

Primary constraints in materials selection are imposed by characteristics of the design of a component which are critical to a successful product. With respect to an insulation barrier, those primary constraints include minimal weight and maximum strength and toughness requirements, while simultaneously keeping the costs comparable to substitutable counterparts, such as glass wool, gypsum board, organic foam, or asbestos.

Obviously, one of the problems with cementitious materials in the past has been that typical cement mixtures are poured into a form, worked, and then allowed to set and cure over a prolonged period of time, typically days or weeks. Experts generally agree that it takes at least one month for traditional concrete products to reach a substantial degree of their optimum strength. (Experts also believe that most concrete products do not reach their maximum strength for several decades.) Such a time period is certainly impractical when manufacturing insulative barriers in bulk or on site.

As a result, a critical feature of certain embodiments of the present invention is that when the cementitious mixture is molded it will maintain its shape (i.e., support its own weight subject to minor forces) in the green state without external support. Further, from a manufacturing perspective, in order for production to be economical, it is important for the molded barrier to rapidly achieve (in a matter of minutes, or even seconds) sufficient strength so that it can be handled using conventional methods, even though the cementitious mixture may still be in a green state.

Another advantage of the microstructural engineering design approach of the present invention is the ability to develop compositions in which cross-sections of the structural matrix are more homogeneous than have been typically achieved in the prior art. Ideally, when any two given cross-sections of about 1–2 mm$^2$ of the cementitious structural matrix are taken, they will have substantially similar amounts of voids, aggregates, fibers, and any other additives or properties of the matrix.

From the following discussion, it will be appreciated how each of the component materials in the cementitious mixture contributes to the primary design constraints. Specific materials and compositions are set forth in the examples to demonstrate how the maximization of the performance of each component accomplishes the combination of desired properties.

B. Insulation Barriers

The term "insulation barrier" as used in this specification and the appended claims is intended to include insulation material of essentially any shape presently available on the market, or that may be developed as a result of the teachings herein. Examples of such insulation barriers include layered and nonlayered insulation blocks placed in attics, walls, floors, or anywhere else in a building, materials wrapped or placed around ducts or pipes, foamed insulation injected into spaces, such as between two or more walls, and insulating cementitious granules placed between walls or inside spaces.

More specialized insulating cementitious containers and packaging for food and beverages are disclosed and claimed in related patent application Ser. No. 07/929,898, now abandoned. In addition, noncementitious insulating containers and packaging for food and beverages are disclosed and claimed in related patent application Ser. No. 07/982,383, now abandoned. For purposes of disclosure, the above-identified patent applications are incorporated herein by specific reference.

C. Hydraulic Cement-Based Materials

Each embodiment and method of the present invention involves the use of the family of binders known as hydraulic cements. A hydraulic cement is characterized by inorganic cements which form hydration reaction products when combined with water. Hydraulic cements are to be distinguished from other cements such as polymeric organic cements.

1. Hydraulic Cements

Terms such as "powdered hydraulic cement," "hydraulic cement," or "cement," as used in this specification and the appended claims, are intended to include clinker and crushed, ground, and milled clinker in various stages of pulverizing and in various particle sizes. Examples of typical hydraulic cements known in the art include: the broad family of portland cements (including ordinary portland cement without gypsum), calcium aluminate cements (including calcium aluminate cements without set regulators, e.g., gypsum), plasters, silicate cements (including $\beta$-dicalcium silicates, tricalcium silicates, and mixtures thereof), gypsum cements, phosphate cements, high alumina cements, microfine cements, slag cements, magnesium oxychloride cements, and aggregates coated with microfine cement particles.

The term "hydraulic cement" is also intended to include other cements known in the art, such as $\alpha$-dicalcium silicate, which can be made hydraulic under hydrating conditions within the scope of the present invention.

The basic chemical components of the hydraulic cements within the scope of the present invention usually include $CaO$, $SiO_2$, $Al_2O_3$, $Fe_2O_3$, $MgO$, $SO_3$, and various combinations thereof. These react together in a series of complex reactions to form insoluble silicates, carbonates (including from $CO_2$, such as in the air or which is dissolved within the added water), sulfates, and other salts or products of calcium and magnesium, together with hydrates of these salts. The aluminum and iron constituents are thought to be incorporated into elaborate ionic complexes within the above-mentioned insoluble salts. The cured cement product is a complex matrix of insoluble salts and hydrates which are complexed and linked together much like stone, and are similarly inert.

Hydraulic cement compositions are typically formed by mixing powdered hydraulic cement and water; the resulting mixture is commonly referred to as "cement paste." The hydraulic cement and water are mixed either simultaneously or subsequently, with some sort of aggregate blended to form a "cementitious mixture." Mortar and concrete are examples of cementitious mixtures formed by mixing hydraulic cement, water, and some sort of aggregate, such as sand or rock.

The terms "hydraulic cement compositions" or "cementitious compositions," as used herein, are intended to broadly define compositions in terms of hydration. In the preferred embodiments of the present invention, the hydraulic cement compositions are materials incorporating a cement which are in the hydration state at a time prior to the initial set of the hydraulic cement paste. It is intended that the terms "hydraulic cement compositions" shall include both cement paste, cementitious mixtures, and final cementitious or concrete products. Hence, the term "cementitious mixture" shall refer to a cement paste to which aggregate, fiber, or other material has been added, whether in the green state (i.e., uncured) or after it has solidified and/or cured.

The present invention may include other types of hydraulic cement compositions such as those discussed in copending patent application Ser. No. 07/981,615 filed Nov. 25, 1992, in the names of Hamlin M. Jennings, Ph.D., Per Just Andersen, Ph.D., and Simon K. Hodson, now U.S. Pat. No. 5,358,676, and entitled "Hydraulically Bonded Cement Compositions and Their Methods of Manufacture and Use," wherein powdered hydraulic cement is placed in a near net final position under pressure prior to the addition of water for hydration. For purposes of disclosure, the above-identified patent application is incorporated herein by specific reference.

Additional types of hydraulic cement compositions include those wherein carbon dioxide is mixed with hydraulic cement and water. Hydraulic cement compositions made by this method are known for their structural integrity. This type of hydraulic cement composition is discussed in copending patent application Ser. No. 07/418,027 filed Oct. 10, 1989, in the names of Hamlin M. Jennings, Ph.D. and Simon K. Hodson, now U.S. Pat. No. 5,232,496 and entitled "Process for Producing Improved Building Material and Product Thereof," wherein water and hydraulic cement are mixed in the presence of a carbon source such as carbon dioxide, carbon monoxide, carbon-enriched gases, carbonate salts, and mixtures thereof. For purposes of disclosure, the above-identified patent application is incorporated herein by specific reference.

The hydraulic cements which are preferably used in the present invention include white cement, portland cement, microfine cement, high alumina cement, and slag cement. These cements have been chosen because of their low cost; a main consideration of the present invention is to achieve a low cost, economically feasible insulation barrier. However, this list of cements is by no means exhaustive, or in any way intended to limit the types of cements which would be useful in making the cementitious insulation barriers described herein. Many other types of cement would work equally well in the present invention, and such cements can be readily identified from comparison with the properties and attributes discussed herein with respect to the exemplary hydraulic cements.

It is obvious that one of the important criteria for an insulation barrier that will be exposed to the forces of nature is that it not be water soluble. Unfortunately, some of the materials (such as plasticizing or stabilizing agents) that are incorporated into such insulation barriers dissolve in water. One of the important advantages of using hydraulic cement to form the underlying support matrix is that the resulting cement matrix encapsulates the aggregates and other materials added to the cement. Hence, an otherwise water soluble component can be incorporated into the insoluble cement matrix, and its advantageous properties and characteristics can be utilized in the final product.

2. Cement Paste

In each embodiment of the present invention, the cement paste is the constituent which eventually gives the insulation barrier the ability to set up and develop strength properties. It is composed of an amorphous mass comprising the various products within the original hydraulic cement. The other ingredients serve the purpose of altering the properties of the final product, including, but not limited to, strength, shrinkage, flexibility, insulating ability, color, porosity, surface finish, and texture.

The percentage of hydraulic cement within the overall mixture varies depending on the identity of the other added constituents. However, hydraulic cement is preferably added in an amount ranging from between about 5% to about 90% as a percentage by weight of the wet cementitious mixture. From the disclosure and examples set forth herein, it will be understood that this wide range of weights corresponds to situations where the volume of the hydraulic cement in the cementitious mixture may vary from 1% or less to more than 99% of the volume of the cementitious mixture.

It will be appreciated from the foregoing that embodiments within the scope of the present invention will vary from a very lightweight "foam-type" product to a somewhat heavier "clay-type" product. In between, it is common to incorporate significant aggregates into a "foam-type" product resulting in the "foam/clay" product which has many of the qualities of both the "foam" and "clay" products. Hence, the amount of the various components will vary depending upon the specific product to be made.

Generally, the preferred amount of hydraulic cement in the "foam-type" products that contain hydraulic cement will be in the range of from about 25% to about 90% by weight of the wet cementitious mixture, and most preferably in the range from about 50% to about 75%. The preferred amount of hydraulic cement in the "foam/clay" products will generally be in the range of from about 5% to about 50% by weight of the wet cementitious mixture, and most preferably in the range from about 5% to about 25%.

With respect to the "clay-type" products, the preferred amount of hydraulic cement will be in the range from about 5% to about 75% by weight of the wet cementitious mixture, more preferably in the range from about 8% to about 60%, and most preferably in the range from about 10% to about 45%.

On the other hand, where an insulation barrier is comprised of different layers or components (one layer giving the barrier strength or support and the other giving the barrier its insulative properties), it is possible, within the scope of the present invention, to include one or more noncementitious binders within the "foam type" insulating component rather than hydraulic cement. Although methylhydroxyethylcellulose is used to add plasticity to, aid the workability of, and increase the thixotropic nature of the cementitious mixture of certain embodiments, it has been found to be a good binder in some circumstances, especially in highly foamed, extremely lightweight materials.

Despite the foregoing, it will be appreciated that all concentrations and amounts are critically dependent upon the qualities and characteristics that are desired in the final product. For example, in a very thin wall structure (even as thin as 0.02 inch) where strength is needed, it may be more economical to have a very high percentage of cement with little or no aggregate or fiber added. Similarly, a mixture of essentially hydraulic cement and water (having a water to cement ratio as low as 0.2) may be foamed so that a large amount of air is entrained in the mixture.

Conversely, in a product in which high amounts of air are incorporated, there may be a much greater percentage of the rheology-modifying agent, only a very small amount of cement, and little or no aggregates or fibers. Such materials can literally be as light as many styrofoam products.

In some applications, it is important that the water to cement ratio be carefully controlled in order to obtain a cementitious mixture that is self-supporting in the green state. Nevertheless, the amount of water to be used is dependent upon a variety of factors, including the type of cement, aggregates, fibers, and other materials or additives to the cementitious mixture, the relative concentrations of each of the material components, the molding or forming process to be used, and the specific product to be made and its properties.

Nevertheless, in typical compositions within the scope of the present invention, the water to cement ratio will fall within the range from about 0.2 to about 10. This range is broad because it covers both "foam-type" and "clay-type" products.

Preferably, "foam-type" products will have a water to cement ratio within the range from about 0.3 to about 2.0, and most preferably within the range from about 0.6 to about 1.0. The water to cement ratio in the "foam/clay" products will generally be about the same as the "foam-type" products.

On the other hand, the "clay-type" products will have a water to cement ratio within the range from about 0.2 to about 10, and most preferably, within the range from about 0.5 to about 1.5. (When the water to cement ratio in the "clay-type" is high, the rheology-modifying agent is probably providing much of the binding and strength characteristics to the cementitious material.)

According to the presently contemplated best mode of the present invention, it has been found desirable that the cement and water be mixed in a high shear energy mixer such as that disclosed and claimed in U.S. Pat. No. 4,225,247 entitled "Mixing and Agitating Device" and U.S. Pat. No. 4,552,463 entitled "Method and Apparatus for Producing a Colloidal Mixture."

For purposes of understanding such high shear energy mixers and their methods of use, the disclosures of the aforesaid U.S. Pat. Nos. 4,225,247 and 4,552,463 are incorporated herein by specific reference. High energy mixers within the scope of these patents are available from E. Khashoggi Industries of Santa Barbara, Calif., the assignee of the present invention. The use of such a high shear energy mixer during the mixing process results in a homogeneous cement paste which has been shown to result in a product with higher strength. Furthermore, these high shear energy mixers can be utilized to entrain significant amounts of air into the cementitious mixture to create "foam-type" products.

D. Rheology-Modifying Agents

As discussed above, a critical aspect of the present invention is the inclusion of a rheology-modifying agent which acts to increase the plastic characteristics of the cementitious mixture. For this reason, the rheology-modifying agent is sometime referred to as a "plasticizer" because it functions to artificially introduce plasticity into the cementitious material so that it will "flow" like clay during a molding, casting, or extrusion process.

There are a variety of natural and synthetic organic plasticizers which may be used in the present invention depending on the particular application. This is because organic plasticizers have a wide range of viscosities and solubilities in water, as well as other distinguishing properties. For example, where it is desirable for the packaging material to more quickly break down into environmentally benign components, it may be preferable to use a rheology-modifying agent which is more water soluble. Conversely, where the packaging material will sustain prolonged exposure to water, it may be preferable to use a rheology-modifying agent which is virtually insoluble in water.

The various organic plasticizers contemplated in the present invention can be roughly organized into the following categories: polysaccharides and derivatives thereof, proteins and derivatives thereof, and synthetic organic materials. Polysaccharide plasticizers can be further subdivided into cellulose based materials and derivatives thereof, starch based materials and derivatives thereof, and other polysaccharides.

Suitable cellulose based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here. Nevertheless, many other cellulose materials have the same or similar properties as these and are equivalent.

Suitable starch based materials include, for example, amylopectin, amylose, sea-gel, starch acetates, starch hydroxyethyl ethers, ionic starches, long-chain alkylstarches, dextrins, amine starches, phosphate starches, and dialdehyde starches.

Other natural polysaccharide based rheology-modifying agents include, for example, alginic acid, phycocolloids, agar, gum arabic, guar gum, locust bean gum, gum karaya, and gum tragacanth.

Suitable protein based rheology-modifying agents include, for example, Zein® (a prolamine derived from corn), collagen derivatives extracted from animal connective tissue such as gelatin and glue, and casein (the principal protein in cow's milk). Another natural rheology-modifying agent which is neither a polysaccharide or a protein is latex. In addition to imparting a rheology-modifying effect when hydrated, latex may also impart some degree of binding to the cured material.

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, and ethylene oxide polymers.

A currently preferred rheology-modifying agent is methylhydroxyethylcellulose. An example of such a product is Tylose® FL 15002—a product available from Hoechst Aktien-gesellschaft located in Frankfurt, Germany. Although a methylhydroxyethylcellulose rheology-modifying agent is preferred, almost any nontoxic plasticizer (including any organic plasticizer listed above) which imparts the same or similar properties as Tylose® would be appropriate.

Closely related compounds include carboxymethylcellulose, hydroxyethylcellulose, and other cellulose derivatives. Other suitable rheology-modifying plasticizing agents include any of the polysaccharide, starch, or protein based or synthetic plasticizers listed above. Other suitable rheology-modifying agents include synthetic clays (such as LAPONITE® which is available from Laporte Industries Ltd. in the United Kingdom).

As indicated, the purpose of the rheology-modifying agent is to thicken the cementitious material and to add lubrication in order to introduce plasticity into the cementitious material. Accordingly, in a presently preferred embodiment, a combination of two different types of methylhydroxyethylcellulose is often utilized. Tylose® FL 15002 (which a 2% solution in water gives a viscosity of 15,000 millipascals) acts as a flocculent and gelatinizing agent to aid in the binding of the cementitious material; this results in a more sticky material that looks somewhat like clay. In addition, Tylose® 4000 is used to act like a lubricant to aid in the flowing of the cementitious material during the molding, casting, or extrusion process.

Another preferred rheology modifying agent that can be used instead of or in conjunction with Tylose® is polyethylene glycol that has a molecular weight of between 20,000 and 35,000. Like Tylose® 4000, polyethylene glycol works as a lubricant and adds plasticity to the mixture. In addition, it results in a smoother surface.

From the foregoing, it will be readily appreciated that the amount of the rheology-modifying agent will vary. Nevertheless, in most typical applications contemplated by the present invention, the amount of the rheology-modifying agent will be within the range from about 0.2% to about 5% by weight of the wet cementitious mixture. In the presently preferred embodiments, the amount of the rheology-modifying agent will be in the range from about 0.3% to about 3.0% by weight of the wet cementitious mixture, and most preferably in the range from about 0.5% to about 1.5% by weight of the wet cementitious mixture.

In certain embodiments where a very lightweight, highly insulative material is desired, the alkylcellulose based rheology-modifying agent can act as the binder in the absence of hydraulic cement. This material may be desirable where a dissolvable product is desired. In these embodiments, the preferred amount of rheology-modifying agents will be in the range from about 0.1% to about 5% by weight, more preferably in the range from about 0.2% to about 3%, and most preferably in the range from about 1% to about 2%.

E. Aggregates

It is within the scope of the present invention to include aggregates commonly used in the cement industry with powdered hydraulic cements, with no particular reference to the time of hydration. However, unlike many concrete products, the main purpose for the addition of aggregates to the compositions of the present invention is to make the cementitious material lightweight, rather than imparting significant strength to the material.

Examples of aggregates which can add a lightweight characteristic to the cementitious mixture include perlite, vermiculite, glass beads, aerogels, hollow glass spheres, calcium carbonate, synthetic materials (e.g., porous ceramic spheres, tabular alumina, etc.), cork, xonotlite (a crystalline calcium silicate gel), lightweight expanded clays, sand, gravel, rock, limestone, sandstone, pumice, and other geological materials. Of course, the choice of the aggregate will depend upon the weight, strength, toughness, texture, surface finish, insulation ability, and aesthetic qualities that might be desired in the resultant product.

In addition to conventional aggregates used in the cement industry, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and such other fibers typically used to prepare various types of composites), may be combined with the hydraulic cements within the scope of the present invention. Even materials such as seeds, starches, gelatins, and agar-type materials can be incorporated as aggregates in the present invention.

Other nontraditional aggregate materials, which are super lightweight and which have superior insulating capabilities, include aerogels, xerogels, sea gels, and any other lightweight, insulating gel.

From the foregoing, it will be understood that the amount of the aggregate will vary depending upon the application. There are many situations when little or no aggregate will be used. However, in most situations, the aggregate will not exceed an amount of about 60% by weight. In the products contemplated by the present invention where high insulation is desired, the amount of aggregates will usually be within the range from about 3% to about 50% by weight, and most preferabl, within the range from about 20% to about 35% by weight of the wet cementitious mixture. Further, it will be appreciated that for any given product, certain of these aggregates may be preferable, while others may not be usable.

Fibrous aggregates are used in the present invention primarily to add form stability to the mixture and to add strength, toughness, and flexibility to the resulting cementitious matrix, although certain fibrous aggregates may also impart some level of insulation to the materials as well. Therefore, the term "aggregates" will refer to all other filler materials which are nonfibrous and whose function is mainly to impart rheological, textural and insulative properties to the materials.

It is also within the scope of the present invention to include set hydraulic cement compositions as examples of aggregates. Examples of hydraulic cement compositions include used insulation barriers of the present invention, which can be recycled and used as aggregates in the hydraulic cement compositions of new insulation barriers within the scope of the present invention. Moreover, due to more restrictive environmental legislation, many ready-mix concrete suppliers are often obligated to find adequate means of handling, recycling, and marketing their waste solids. The present invention sets forth a use for such waste solids.

For many uses, it is preferable to include a plurality of differently sized and graded aggregates capable of filling interstices between the aggregates and the hydraulic cement so that less water is necessary and, hence, greater strength can be achieved. In such cases, the differently sized aggregates would typically have particle sizes in the range from as small as about 0.5 µm to as large as about 2 inches. (Of course, the purpose of the resulting cementitious product will dictate the preferred properties of the concrete and the appropriate size of the aggregates to be used.) It is within the skill of one in the art to know generally which aggregates are to be used to achieve the desired characteristics in the final cement or concrete article or structure.

For example, where very thick-walled insulation is desired, very large aggregates can be used. Conversely, where a thin-walled cementitious structure is involved, usually in the case of the higher density support layer, it is preferable to use much smaller aggregates. As a general rule, the aggregates should not have a diameter of more than one-fourth the wall thickness of the material involved.

In certain preferred embodiments of the present invention, it is desirable to maximize the amount of the aggregates in the cementitious mixture in order to maximize the properties and characteristics of the aggregates (such as their lightweight or insulative qualities). In order to maximize the amount of the aggregates, the use of particle packing techniques is desirable. A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the thesis of Andersen, P. J. "Control and Monitoring of Concrete Production—A Study of Particle Packing and Rheology," The Danish Academy of Technical Sciences (1990). For purposes of teaching particle packing techniques, the disclosures of the foregoing article and thesis are incorporated herein by specific reference. The advantages of such packing of the aggregates can be further understood by reference to the examples which follow, in which hollow glass balls of varying sizes are mixed in order to maximize the amount of the glass balls in the cementitious mixture.

Where strength is less important and high insulation is the overriding goal for a given application, it may be preferable to incorporate into the cement matrix an aggregate which has a low thermal conductivity, or "k-factor" (defined as W/m.K), which is roughly the reciprocal of the expression commonly used in the United States for thermal resistance, or "R-factor," which is generally defined as having the units $hr\text{-}ft^{2\circ} F./BTU$. The term "R-factor" is most commonly used in the United States to describe the overall thermal resistance of a given material without regard to the thickness of the material. However, for purposes of comparison, it is common to normalize the R-factor to describe thermal resistance per inch of thickness of the material in question, or $hr\text{-}ft^{2\circ} F./BTU\text{-}in$.

For purposes of this application, the insulation ability of a given material will hereinafter be expressed only in terms of the IUPAC method of describing thermal conductivity, or k-factor. The conversion of thermal resistance expressed in British units ($hr\text{-}ft^{2\circ} F./BTU\text{-}in$) to IUPAC units can be performed by multiplying the normalized R-factor by 6.9335, and then taking the reciprocal of the product.

Preferred lightweight aggregates include expanded or exfoliated vermiculite, perlite, calcined diatomaceous earth, aerogels, xerogels, xonotlite, hollow glass spheres, and hollow plastic spheres—all of which tend to contain large amounts of incorporated interstitial space.

This interstitial space, which is comprised of microscopically small fixed air spaces, greatly lowers the k-factor of these aggregates, thereby greatly increasing the insulation capability of the container involved. However, this list is in no way intended to be exhaustive, these aggregates being chosen because of their low cost and ready availability. Nevertheless, any aggregate with a low k-factor, which is able to impart sufficient insulation properties into the insulation barrier, is within the purview of the present invention.

F. Fibrous Materials

Fibers are a special kind of aggregate which can be added to the cement paste to increase the toughness and flexural, tensile, and compressive strengths of the resulting cementitious materials. The concept of adding fibers is analogous to reinforcing concrete with steel bars or wire, except that the reinforcement is on a "micro" rather than "macro" level. The use of fibers dramatically increases the fracture energy of the cementitious materials, which is very useful where high strength and durability are required.

The fibers which are incorporated into the cement matrix are preferably naturally occurring fibers, such as fibers extracted from plant leaves and stems. However, they can be any naturally occurring fiber typically comprised of cellulose. Other suitable fibers include fibers made from glass, silica, ceramic or metal. (One of the glass fibers utilized in the specific examples which follow is CEMFILL®, a product manufactured by Pilkinton Corp. Preferably, such glass fibers are pretreated to be alkali resistant.) The only limiting criteria is that the fibers impart the desired properties without posing significant health hazards to manufacturers, installers, or end users (e.g., home or office dwellers) of the insulation material.

Preferred fibers of choice include glass fibers, abaca fiber (or Manila hemp, which comes from a Philippine plant related to the banana), wood fibers (such as pine), and recycled paper fibers. The abaca fibers used in the examples which follow were purchased from Skamol Corp. These fibers were used due to their low cost, high strength, and ready availability. Nevertheless, any equivalent fiber which imparts strength, as well as flexibility if needed, is certainly within the scope of the present invention.

It is preferable that the fibers have a minimum length to width ratio (or "aspect ratio") of at least 10:1. However, fibers with a greater aspect ratio are better because longer, narrower fibers are able to impart a greater amount of strength to the cement matrix without adding more bulk and mass to the mixture. Fibers with an aspect ratio of greater than 100:1 are more preferred, with an aspect ratio of between 200:1 to 300:1 being most preferred.

Another important consideration is the relation between fiber length and the length of the cement particles within the cement matrix. At a minimum, for the fibers to impart even minimal strength to the cement matrix, they must be at least twice the length of the cement particles within the cementitious mixture. The fibers are more preferably many times the length of the cement particles. Fibers having at least 10 times the average length of the cement particles work well. Fibers having at least 100 times the average length of the cement particles work better, while fibers having a length of greater than 1000 times the average length of the cement particles work best. High fiber length to cement length ratios can be achieved by either increasing the absolute length of the added fibers or, alternatively, by using a more finely milled cement.

As with aggregates, the amount of fiber added to the cementitious matrix will vary depending upon the desired product. Since the purpose of the fibers is usually to add strength, this becomes the principal criterion for determining the amount of fibers to be added. Nevertheless, in most situations the amount of the fibers will not exceed about 20% by volume. In both the "foam-type" and the "clay-type" insulation products or constituents contemplated by the present invention, the amount of fibers will generally be within the range from about 0.5% to about 10% by volume, and most preferably, within the range from about 1% to about 6% by volume.

G. Air Voids

In those applications where insulation and not strength is the overriding factor (as with insulation barriers where structural support is not important, or where the weaker, more insulating material is reinforced with a layer of stronger cementitious material) it may be desirable to incorporate into the cementitious matrix air pockets or voids in addition to, or in place of, aggregates in order to increase the insulative properties of the final product. The incorporation of air voids into the cementitious mixture is carefully calculated to impart the requisite insulation characteristics without unduly degrading the strength of the insulation barrier (or portion thereof) to the point of nonutility. Generally, however, where insulation is not an important feature of a particular product, or portion thereof, it is desirable to minimize any air voids in order to maximize strength and minimize weight and volume.

In certain embodiments, air pockets can be introduced by high shear, high speed mixing of the cement paste, with a foaming or stabilizing agent added to the mixture to aid in the incorporation of air pockets. The high shear, high energy mixers discussed above are particularly adept in achieving this desired goal. Suitable foaming and stabilizing agents include commonly used surfactants and materials; currently preferred embodiments of such surfactants include a polypeptide alkylene polyol (Mearlcrete® Foam Liquid) and a synthetic liquid anionic biodegradable solution (Mearlcel 3532®), both available from the Mearl Corporation in New Jersey. Another foaming and stabilizing agent is vinsol resin.

In this process, a gas can also be injected into the cement paste such that it is substantially uniformly incorporated by the high energy mixer and then stabilized by the foaming and stabilizing agents. A variety of different gases can be utilized; many inexpensive gases suitable for use in the cement paste are available. One currently preferred gas is carbon dioxide, since it can react with the components of the hydraulic cement to increase both the form stability as well as the foam stability of the cementitious mixture through a false setting mechanism. (The incorporation of carbon dioxide does not, however, appreciably increase the rate of hydration or setting.)

The early false setting and foam stability is thought to result from the reaction of $CO_2$ with the hydroxide ions within the cementitious mixture to form carbonate ions. Achieving high foam stability of the air voids within the cementitious mixture is often crucial to maximizing both the strength and insulation properties of the cured cementitious insulation material. Foam stability helps maintain over time the dispersion, and prevents the agglomeration, of the air voids within the unhardened cementitious mixture. Failure to prevent the coalescence of the air voids actually decreases the insulation effect, while at the same time greatly decreases the strength, of the cured cementitious mixture.

This is because larger air voids act create significantly larger discontinuities within the cementitious structural matrix and, hence, weaker links within the matrix which are more easily fractured. At the same time, the creation of larger, more agglomerated air pockets necessarily decreases the dispersion of the air void system within the matrix and increases the number and volume continuous cementitious "bridges" throughout the foamed material, which bridges act as more effective conduits of heat. Hence, less finely dispersed air results in greater heat conductivity of the cementitious material.

Maintaining the highest possible dispersion of air voids, and thus maintaining the greatest number and smallest size of air voids, is optimal and can be achieved by increasing the foam stability. As stated above, one such method is through the addition of carbon dioxide. Factor such as raising the pH, increasing the concentration of soluble alkali metals such as sodium or potassium, adding a stabilizing agent such as a polysaccharide rheology modifying agent, and carefully adjusting the concentrations of surfactant and water within the cementitious mixture all increase the foam stability. Adjusting the concentrations of water and surfactant affects the propensity of air to be entrained in an emulsion-like fashion within the cementitious mixture.

On the other hand, raising the pH and/or increasing the concentration of alkali metals increases the rate and the amount of carbon dioxide dissolution within the aqueous phase of the cementitious mixture. This is because both increase the solubility of carbonate ions, which might otherwise form insoluble precipitates with calcium ions present in all hydraulic cements.

This process of incorporating gas into the cementitious mixture is generally suitable for processes where the cementitious mixture is relatively nonviscous, such as in injection molding where the cement paste is injected through small holes, or where a foamed cementitious insulation product is injected between structural walls or simply poured into molds.

During the process of molding and/or curing the cementitious mixture, it is often desirable to heat up the cementitious mixture in order to control the air void system and to aid in stabilizing the cementitious mixture form in the green state (immediately after molding). Of course, heating aids in rapidly removing significant amounts of the water from the cementitious mixture.

If a gas has been incorporated into the cementitious mixture, heating the mixture to 250° C. will result (according to the gas-volume equation) in the gas increasing its volume by about 85%. When heating is appropriate, it has been found desirable for the heating to be within a range from about 50° C. to about 250° C. More importantly, if properly controlled, heating will not result in the cracking of the structural matrix, or yield imperfections in the surface texture, of the insulation barrier.

In other applications, where viscosity of the cement paste is high, such as in roller casting or ram pressing, it is much more difficult to obtain adequate numbers of air voids through high shear mixing. In this case, air voids are alternatively introduced into the cement paste by adding an easily oxidized metal, such as aluminum, zinc, or tin into the highly alkaline cement paste. To enhance the effect of the metal, it is preferable to add a base (such as sodium hydroxide) to the cementitious mixture, which preferably raises the pH to between about 13–14 and causes these metals to undergo oxidation. At the same time, some of the ions (such as hydrogen ions) present in the water are concomitantly reduced to a gaseous product (such as hydrogen gas), which then becomes dispersed throughout the cement paste in the form of microscopic bubbles.

An air entraining agent is also preferably added so that the air bubbles are maintained in the cementitious mixture while it cures. Vinsol resin is one presently preferred air entraining agent; this compound is commonly available, but that which was used in the examples which follow was obtained from Sika Company.

Often, it is further desirable to heat the mixture in order to increase or control the rate of oxidation and facilitate the formation of hydrogen bubbles. It has been found that heating the molded product to temperatures in the range of from about 50° C. to about 100° C., and preferably about 75° C. to about 85° C., effectively controls the reaction and also drives off a significant amount of the water. Again, this heating process does not result in the introduction of cracks into the matrix of the final product.

It has also been discovered that, after the cementitious container has solidified, many of the compositional designs of the present invention result in a matrix that is slightly permeable, at least to tiny hydrogen gas molecules, which can diffuse out of the cement matrix.

This second method of introducing air voids into the cement matrix can be used in conjunction with, or in place of, the introduction of air through high speed, high shear mixing in the case of low viscosity cement pastes used in injection molding. Air voids not only increase the insulative properties of the cementitious insulation barriers, but also greatly decrease the bulk specific gravity, and hence the weight, of the final product. This reduces the overall mass of each insulation barrier, which reduces the amount of material that is required for the manufacture of the insulation barrier.

Aluminum and zinc are the preferred metals of choice because of their relatively low cost compared to other metals which undergo oxidation when exposed to basic conditions. Nevertheless, it should be understood that any metal that is easily oxidized when exposed to highly alkaline conditions would work equally well and would be within the scope of the present invention.

H. Superplasticizers

The terms "superplasticizer" or "superplasticizers" shall hereinafter refer to the class of materials which can be added to reduce the viscosity and yield stress of the cementitious mixture. Greatly reducing the viscosity and yield stress may be desirable where high plasticity, cohesiveness, and/or form stability are less important. Adding a superplasticizer aids in keeping the cementitious mixture workable even when very little water is added, particularly where there is a "deficiency" of water. Whether or not there is a deficiency of water is a function of the amount of water needed to occupy the interstices between the particles in the cementitious mixture, including the cement particles themselves and the particles within the aggregate material and/or fibrous material.

Superplasticizers generally work by being adsorbed onto the surface of the cement particles and/or into the near colloid double layer of the cement particles. This creates a negative charge around the surfaces of the particles, causing them to repel each other. Because of this mechanism, superplasticizers can be thought of as dispersants. However, because of this coating mechanism it is usually necessary to combine the superplasticizer with the cementitious mixture before adding a rheology modifying agent such as Tylose®. Otherwise, the superplasticizer will not be able to become adsorbed on the surface of the cement particles, as the Tylose® will be irreversibly adsorbed onto the surface of the particles, thus bridging them together.

A preferred superplasticizer is sulfonated naphthalene-formaldehyde condensate, such as WRDA 19, available from Koa Soap Company, Ltd, located in Japan. Other superplasticizers which would work well include sulfonated melamine-formaldehyde condensate, lignosulfonate, and acrylic acid.

In those cases where it is desirable to include a superplasticizer within the cementitious mixture, preferred amounts will generally range up to about 5% by weight of the hydraulic cement, more preferably within the range of between about 0.25% to about 4%, and most preferably within the range of between about 0.5% to about 2.5%. However, it is important not to include too much superplasticizer, as it tends to retard the hydration reactions between the hydraulic cement and water. Adding too much superplasticizer can, in fact, prevent hydration, thus destroying the binding ability of the cement paste altogether.

I. Coatings

For commercial purposes, it is often desirable that the surfaces of the insulation barriers be capable of receiving ink or other printing indicia. Of course, cementitious products such as those disclosed herein are particularly well suited for such a use. Furthermore, it is within the scope of the present invention to coat the insulation barriers with sealing materials and other coatings, many of which would increase the ability to put print on the insulation barriers.

One such coating is calcium carbonate, which is well known in the printing industry as being an effective surface on which indicia can be placed. Hence, most of the presently known prior art methods of printing or placing indicia on this coating are applicable in connection with the present invention. Not only can decals be placed on the surface, but the porosity of the cementitious surface itself is such that it will properly absorb ink without running; even multiple color or multiple layer printing is relatively easily achieved.

Other coatings which might be appropriate include acrylics, polyacrylates, polyurethanes, melamines, polyethylene, synthetic polymers, waxes (such as bees wax or petroleum based wax). In some cases, it may be preferable for the coating to be elastomeric, deformable, or waterproof, or a combination thereof.

J. Densities of the Materials

The densities of the resulting cementitious insulation barriers manufactured according to the present invention will depend largely on the amount of entrained air and/or the amount of included lightweight aggregate within the cementitious mixture, or the density of the noncementitious layer (s) in the case of a laminate. In addition, the density of the material will be generally inversely correlate with its ability to insulate.

Depending on the type and amount of the added aggregate, the amount of entrained air, and/or the type of material within a laminate structure, the densities of the insulation materials of the present invention will generally be within the range from about 0.1 g/cm$^3$ to about 2 g/cm$^3$. The density will be preferably less than about 2 g/cm$^3$, more preferably less than about 1 g/cm$^3$, and most preferably less than about 0.5 g/cm$^3$.

II. Specific Applications of the Materials into Insulation Barriers.

It is important that the basic structural component of the insulation barriers of the present invention be the hydraulic cement matrix. Within the basic matrix of hydraulic cement and water are incorporated other components which add additional characteristics and properties, such as fibers, aggregates, discontinuous voids, rheology-modifying plasticizing agents, and accelerants.

Cementitious materials of the present invention which have little or no entrained air and/or light weight aggregates are less insulative than their lighter weight counterparts, but have superior strength properties. In certain embodiments of the present invention it is desirable to sandwich, or otherwise join together, a cementitious layer for structural support with more highly insulative cementitious or noncementitious materials to form a laminate structure in order to maximize both the insulative ability and strength of the resulting insulation barrier.

In addition, in the case where the more highly insulative material is a cementitious material, the structural layer can be a noncementitious material such as plastic, metal foil, paper, fiberglass fabric, wood, wood pulp, or any other appropriate supporting material known in the art. For other applications, it may be preferable to use an extremely insulative and lightweight cementitious material by itself without added structural layers. Examples of this are where, e.g., a "foam-type" cementitious insulation material is injected between walls of a building.

Where one or more layers of the insulation barrier consists of a cementitious material, the low density, highly foamed, highly insulative layer can even include a noncementitious material. One example is a foamed product formed from a mixture containing an aggregate, water, and a noncement binder, such as any of the rheology modifying agents listed above. A preferred noncement binder is Tylose®, or methylhydroxyethylcellulose. Although Tylose® is often used as a plasticizer in many of the embodiments of the present invention, it has been found to be an adequate binder in cases where high structural strength is not required.

Other suitable noncement binders include most of the theology modifying agents listed above, including methylhydroxyethylcellulose, hydroxymethylethylcellulose, carboxymethylcellulose, methylcellulose, ethylcellulose, hydroxyethylcellulose, hydroxyethylpropylcellulose, amylopectin, amylose, sea gel, starch acetates, starch hydroxyethyl ethers, ionic starches, long-chain alkylstarches, dextrins, amine starches, phosphate starches, dialdehyde starches, alginic acid, phycocolloids, agar, gum arabic, guar gum, locust bean gum, gum karaya, gum tragacanth, Zein®, collagen derivatives extracted from animal connective tissue such as gelatin and glue, casein, latex, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, and ethylene oxide polymers.

A. Purposes of Components in Cementitious Mixtures

As discussed above, fibers are added to impart strength and some insulation to the cementitious insulation barrier. Aggregates are employed to increase the barrier's ability to insulate and to decrease the bulk specific gravity of the cementitious mixture. Discontinuous, nonagglomerated air voids can be mechanically or chemically introduced into the cementitious mixture, thereby decreasing the bulk specific gravity, and increasing the insulating ability, of the final product.

Because this invention is directed towards materials which will be handled by installers and exposed to end users somewhat, they will preferably not contain hazardous substances, as do other prior art insulation materials such as asbestos, polyisocyanate foam, or UFFI foam. The insulation barriers of the present invention are typically comprised of a hydraulic cement, one or more aggregates, one or more fibers, and a rheology-modifying plasticizing agent. Appropriate hydraulic cements that can be used herein contain differing quantities of the following compounds before hydration: CaO, $SiO_2$, $Al_2O_3$, $Fe_2O_3$, MgO, and $SO_3$. Upon hydration, these react to form very stable, unreactive rock-like compounds essentially harmless to humans and animals.

The fibers used herein are preferably natural fibers made from cellulose or glass fibers. Either type of fiber is harmless to humans and animals. The aggregates used in this invention are preferably small, lightweight rock-like substances or hollow glass spheres which contain a high percentage of air voids. Like cement, these are also very stable, unreactive, and harmless to humans and animals.

Aggregates are added mainly to add insulation ability to the final cementitious product (in the case of lightweight aggregates), although they may also be added to increase the strength of the final product (in the case of stronger, more dense aggregates). The size of the aggregates is controlled so that they are preferably about one fourth (or smaller) of the thickness of the insulation barrier to be manufactured. As mentioned above, it is frequently desirable to employ particle packing techniques in order to maximize the desirable properties and characteristics of the aggregates into the cementitious mixture. Simply stated, these techniques maximize the amount of the aggregates in the matrix and minimize the space (and hence the discontinuities) between the aggregates. Thus, the strength and other properties of the total cementitious matrix becomes dependent upon that of the aggregates and the hydraulic cement.

The discontinuous phase of nonagglomerated air voids greatly increases the insulative ability of the cementitious material. Maximization of the insulating effect of the air voids, as well as maximization of strength of the foamed material, is achieved by initially creating the smallest and most well-dispersed voids possible. It is equally important to stabilize the foamed mixture in order to maintain the fine, even dispersion of the air voids using the methods described above. In any event, the air voids that may be incorporated within the cementitious structural matrix will contain none of the harmful substances that can diffuse out of many foamed insulation products in use today. The voids within polystyrene foam insulation often contains harmful CFC's, while UFFI contains formaldehyde.

Typically, the cementitious insulation barriers of the present invention will have a compressive strength to bulk density ratio in the range from about 1 to about 300 MPa-g/cm$^3$. In the preferred embodiments, the compressive strength to bulk density ratio will usually be in the range from about 2 to about 50 MPa-g/cm$^3$, with the most preferred range being from about 3 to about 20 MPa-g/cm$^3$.

A significant advantage of the cementitious insulation barriers manufactured according to the present invention is that they do not require or release dangerous or ozone depleting chemicals. If disposed of into the earth, they will not persist as will synthetic materials, which must biodegrade (often after many years or decades) before becoming environmentally neutral. Instead, waste insulation barriers of the present invention are essentially composed of the same materials already found in the earth. Under the weight and pressure of typical landfills such insulation barriers will crumble and break down into an environmentally neutral powder that is the same as, or at least compatible with, the dirt and rock already found within the earth.

Furthermore, cementitious insulation barriers described herein are fully recyclable with a minimum amount of energy and effort. Unlike petroleum-based insulation products which require a substantial amount of processing in order to restore them to a suitable state as raw starting materials, cementitious insulation barriers can be ground up and recycled by merely reincorporating the grindings into new insulation barriers as an aggregate component within a virgin cement paste. This quality of containing both a cementitious binder and an aggregate is a further departure from prior art insulation materials which typically consist of a uniform material such as polystyrene, glass fibers, or urea-formaldehyde wherein the strength and insulating properties are derived from the same components.

B. The Processing Techniques and Conditions

The combination of hydraulic cements, aggregates, air voids, and fibers results in a composition that can be formed into relatively thin, strong sheets or walls; they can be formed into very thick, porous materials having with extremely high insulation capabilities; or they may contain a combination of the two. Consequently, the insulation barriers of the present invention can be made into a variety of shapes and thicknesses and can take the place of any presently known insulation material. In addition, they can be formed into relatively thin sheets and used in place of conventional wallboard.

The advantage of a cementitious wallboard over gypsum board is that the former is simultaneously much more lightweight, insulative, yet has comparable and even superior strength, depending upon its composition. Indeed, the combination of using a more insulating wallboard, along with insulation having the same qualities of presently known insulation methods, results in a better insulated building.

In order for the material to exhibit the best properties of high flexural strength and insulation, the fibers can be aligned or stacked according to the present invention, instead of being randomly dispersed, throughout the cement.

It is usually preferable for the fibers to be laid out in a plane that is parallel to either of the two surfaces of the cement sheet or insulation barrier wall.

Such alignment of fibers is achieved either by roller casting, ram-pressing, pull-trusion, hot pressing, or high pressure extrusion of a plastic matrix. These processes result in near zero porosity in terms of large, continuous and unwanted air pockets which usually occur during normal cement manufacture. This greatly increases the flexural strength of the cement material and reduces the tendency of splitting or tearing when the insulation barrier is exposed to external mechanical forces.

The undesirable discontinuities and voids in typically cementitious products should not be confused with the micro-pockets of air (or other gas) that are intentionally introduced by the direct introduction of gas, the use of a high energy mixer, or the addition of reactive metals. Undesired voids or discontinuities are large and randomly dispersed, and offer little in terms of added insulative properties, while at the same time greatly reducing the consistency and strength of the cement matrix. In contrast, the intentionally introduced gas bubbles or voids are generally very small, uniformly dispersed throughout the cementitious mixture, and able to insulate without substantially reducing the strength of the underlying cementitious structural matrix.

Insulation barriers incorporating large amounts of gas bubbles or voids and made by this method exhibit the insulating properties similar to those of styrofoam insulation barriers. For example, cementitious insulation barriers made according to the present invention have been shown to provide excellent insulation. For instance, the highly foamed, ultra lightweight materials have demonstrated k-factors as low as 0.0212 W/m.K. Most of the laminates having an insulating layer sandwiched between two structural sheets had k-factors of between about 0.036 to 0.0515 W/m.K. Even the structural sheets themselves had k-factors of about 0.22 W/m.K.

By altering the quantities of cement, water, aggregates, fibers, and rheology-modifying plasticizing agents, it is possible to control the rheology of the cement paste. For example, in the case of ram-pressing or roller casting it is important to start with a relatively highly viscous cementitious mixture which is form stable in the green state so that it can maintain its shape after being formed, even before being fully cured.

On the other hand, in the case of extrusion, pull-trusion, hot pressing, filling voids between walls, or simply pouring it into molds, the cementitious mixture is preferably less viscous. Because insulation barriers formed by these methods solidify within a mold, it is not necessary that these cementitious mixture become form stable as quickly as in other types of processing. Nevertheless, even these less viscous cementitious mixtures must be able to become form stable very rapidly after being placed in the mold in order for the process to be economical. Generally, the longer the product remains in the mold, the higher the cost of manufacturing. As discussed elsewhere, heating the mold greatly increases the form stability of the molded cementitious mixture.

Nevertheless, whether a viscous or nonviscous cement paste is required, it is desirable to use a minimal amount of water. This is because it is important to control the capillary action of the water in the cementitious mixture, as this is a cause of the stickiness of the cementitious mixture, which in turn can cause problems in demolding the cementitious mixture from the mold. Hence, the capillary action of the water is preferably reduced to allow for quick release of the cementitious mixture from the mold. Using less water further results in a stronger cured or hardened material. However, greater amounts of water can be used in the case of heating, which quickly drives off excess water and creates a steam layer between the cementitious mixture and the mold.

As discussed above, there are a variety of suitable rheology-modifying agents. The use of a rheology-modifying agent allows for the use of less water while allowing the mixture to deform and flow when subjected to forces associated with the molding process. The rheology-modifying agent adds form stability so that the molded cementitious product will maintain its shape without external support and resist forces involved in the subsequent handling of the material.

1. The "Molding" Process

During the mixing of the cementitious paste, it is often important to obtain flocculation or gelation of the mixture. From a macroscopic perspective, flocculation gives the cementitious mixture a more plastic-like characteristic.

For purposes of simplicity, the term "molding," as used in this specification and the appended claims, is intended to include a variety of molding, casting, and extrusion processes discussed herein, or that are well known in the art with respect to materials such as clays, ceramics, plasters, and plastics, as well as the process of releasing (or "demolding") the cementitious product from the mold. The term "molding" also includes additional processes that might occur while the cementitious mixture is in the mold such as, e.g., heating the cementitious mixture to expand the cementitious mixture in the mold, increase the reaction of any added metal, and create a steam barrier to prevent sticking.

In order for the cementitious mixtures of certain embodiments (usually the clay-like structural portion) to be effectively molded, it is important that the cementitious mixture be form stable in the green state; that is to say, the molded product should rapidly (preferably in three seconds or less) be able to support its weight without external support. Further, it must harden sufficiently so that it can be quickly ejected from the mold without sustaining significant damage. Otherwise, the cost and difficulty of molding may make the process uneconomical or unfeasible. In addition, the surface of the molded cementitious article may not be overly tacky, as that would make the demolding process impossible and make the handling and stacking of the molded articles more difficult. Heating the mold (and, therefore the surface of the molded product) causes the surface to harden more quickly and reduces its tackiness.

There are several modifications to conventional molding processes which are preferably employed in order to ease the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of polished steel coated with nickel, chromium, Teflon®, or Deleron®. Similar effects can be achieved by heating the mold to form a steam barrier.

If a gas has been incorporated into the cementitious mixture, heating that mixture to 250° C. will result (according to the gas-volume equation) in the gas increasing its volume by about 85%. When heating is appropriate, it has been found desirable for that heating to be in the range from about 50° C. to about 250° C. More importantly, when properly controlled, heating will not result in the formulation of cracks or other imperfections in the insulation barrier.

In fact, the process of adding gas bubbles to the cementitious mixture during the molding process can help the molded product to quickly gain stability. For the foregoing disclosure, it will be apparent that this can be accomplished by the addition of a gas-generating material, such as an easily oxidized metal like zinc or aluminum, and that the gas generating process can be accelerated by the addition of a base and/or heat.

2. The Curing Process

Terms such as "cure" or "curing" shall refer to the process whereby a cementitious mixture achieves a substantial portion of its total strength, generally through the process known as "hydration," but also due to simply removing a significant portion of the water within the cementitious mixture, such as by heating. Nevertheless, even where water is driven off by heating, even to the point where the molded cementitious product attains a certain level of stiffness, the hydraulic cement still undergoes normal hydration, albeit at an elevated rate catalyzed by the addition of heat.

Even before the molded cementitious compositions obtain significant final strength through the hydration process they must also rapidly gain sufficient strength while still in the green state so that they can be mass-produced and handled within reasonable time periods. This is in sharp contrast to typical cement products, which take hours, even days, to reach even minimal strength. Thus, high green strength is often essential for the molded product to be quickly removed from the mold, further processed as necessary, stacked, and packaged.

While no significant processing condition is necessarily modified for curing the products within the scope of the present invention, many of the features discussed above (e.g., inter alia, the use of a rheology-modifying agent, controlling the capillary action of water, the introduction of air voids throughout the cementitious mixture, the use of heat, and creating form stability in the green state) are important for the cementitious products to achieve strength quickly and properly cure.

However, as stated above, heating the molded material causes earlier hardening by more driving off any excess water. In addition, heat catalyzes the hydration reaction and greatly increases the rate of curing, reducing the time from 28 days to as low as 2 days at temperatures of about 100° C. Another method of increasing the rate of hardening is by placing the molded material into an autoclave, which subjects the molded article to both elevated temperature and pressure. Autoclaving also results in a final cured material having up to 50% more strength.

B. Specific Insulation Products

Due to the wide variety of situations where insulation may be desired, the shape, size, thickness, density, texture, content, insulative ability, etc. of the insulation barriers within the purview of the present invention may vary greatly. For example, cementitious insulation barriers can be used in place of traditional home and building insulation made from, for example, glass wool, polyurethane, or UFFI. They can also be used to wrap hot water pipes, heating ducts, cooling ducts, refrigeration hoses, or any other conduit which may require an insulative wrapping. Other applications include insulative containers such as coolers, jugs, cups, plates, or cartons. Finally, the cementitious insulation materials of the present invention could be pelletized and used as loose fill insulation.

In a preferred embodiment, the cementitious materials of the present invention are included within insulative sheets or panels. As the cementitious material becomes less dense and more insulative, the strength of the material generally decreases. Depending on the thickness of the desired panel, it often may be possible to simply increase the thickness of the panel in order to increase the gross insulative ability of the panel without reducing the density (and strength) of the panel. In other situations, strength may not be a factor, such as where the insulation material is placed between supporting structures. In that case, the cementitious insulation material can be foamed or doped with lightweight aggregate to increase the insulation ability of the material without regard to the strength characteristics of the material.

In other situations where the insulation panel must be kept sufficiently small, but where both strength and insulation ability are important, it may be necessary to incorporate within a panel of limited size both properties of high strength and high insulation. In order to manufacture a panel that has sufficient strength and insulation properties it is often desirable to form a laminate, or sandwich structure, which combines two or more sheets together. At least one of the sheets is preferably an ultra lightweight, highly foamed or aerated material having superior insulative qualities. At least one of the other sheets is preferably strong, tough, ductile, and resistant to stress. Often, a thicker, more insulative layer is sandwiched between two thinner sheets of structural material.

Preferred insulative materials include any of the highly foamed, or entrained air containing, cementitious materials described herein. Such cementitious materials may also include any number of lightweight, highly insulative aggregate materials such as perlite, hollow glass spheres, hollow plastic spheres, aerogel, xerogel, sea gel, exfoliated rock, expanded clay, or any other material containing a large amount of entrapped air or space. In addition, in the case where strength is not a factor, lightweight foamed products which do not contain any cement can be used, particularly where other means of support or strength are present, such as an attached layer of stronger, more durable cementitious material, or where the insulation material is merely being used as loose fill insulation, such as in attics or between walls.

Any of the lightweight, highly insulative materials according to the present invention can also be pelletized or otherwise formed or broken into smaller particles, which can be place or poured into spaces or surfaces such as in attics or between walls.

The main thing to realize, however, is that the actual form, shape, or thickness of the insulation described herein will be determined by the particular need or application in question. The list of different insulation barriers described in this section should be viewed as merely illustrative and not exhaustive. Each of the possibilities cannot be set forth herein, although one skilled in the art would be able to alter the shape, thickness, size, or form of the material to conform to a particular need.

Instead of using the fragments of insulative cementitious materials, or pelletized insulative cementitious materials, as loose fill insulating material, it may be advantageous to encapsulate the material within a bag or other flexible compartment or enclosure. This enables the easy placement or removal of the insulating material from a given location. For example, when insulating the top of a ceiling of a house or building, it may be advantageous to simply place cementitious fragments or pellets packed within bags of a predetermined size into the spaces between the boards on top of the ceiling.

This method may also be preferred over using insulating boards or sheets due to the greater flexibility or pliability of the bags of loose fill cementitious pellets or fragments. This allows for greater ease in packing the cementitious insulation within odd-size spaces or around corners or obstacles that may be encountered.

Preferred bagging or encapsulation materials include plastic, paper, organic fabric (such as burlap or muslin), fiber glass fabric, foil, or any combination of these.

III. Examples of the Preferred Embodiments.

To date, numerous tests have been performed comparing the properties of insulation materials of varying composition. Below are specific examples of cementitious compositions which have been created according to the present invention.

EXAMPLE 1

A plate having good insulation properties was formed from a cementitious mixture containing the following components:

| Portland White Cement | 2.0 kg |
| --- | --- |
| Water | 1.004 kg |
| Perlite | 0.702 kg |
| Tylose ® 4000 | 60 g |

The cement, Tylose®, and the perlite were mixed for about 2 minutes; thereafter, the water was added and the mixture was blended for an additional 10 minutes. The resultant cementitious mixture had a water to cement ratio of approximately 0.5. The amount of the cement paste (cement and water) in this cementitious mixture was 79.8% by weight, with perlite comprising 18.6%, and the Tylose® being 1.6% by weight of the cementitious mixture.

The resultant cementitious material was extruded and then passed between a pair of rollers to form an insulating plate with a wall thickness of ¼ inch. The plate had a k-factor of 0.16 W/m.K and a bulk specific gravity of about 1.6 g/cm³. In general, the insulation barrier was designed to have a predetermined bulk density by adding porous aggregates such as perlite or calcium silicate microspheres. These aggregates have a low specific gravity, and it was believed that they would impart adequate insulative properties to the insulation barriers. However, while these examples demonstrate that it is possible to manufacture a lightweight insulative barrier from cement that was relatively form stable in the green state, they were not as insulative as later compositions in which air entrainment methods were used.

EXAMPLE 2

A plate having good insulation properties was formed from a cementitious mixture containing the following components:

| Portland White Cement | 2.0 kg |
| --- | --- |
| Water | 1.645 kg |
| Perlite | 0.645 kg |
| Tylose ® 4000 | 20 g |
| Tylose ® 15002 | 15 g |
| Cemfill ® glass fibers (4.5 mm; alkali resistant) | 370 g |

The cementitious mixture was made utilizing the procedures set forth with respect to Example 1, except that the fibers were added after mixing the cement, water, Tylose®, and perlite for about 10 minutes. The combined mix was then mixed for an additional 10 minutes. The resultant cementitious mixture had a water to cement ratio of approximately 0.82. The amount of the cement paste (cement and water) in this cementitious mixture was 77.6% by weight, with perlite comprising 13.7%, the Tylose® 4000 and 15002 comprising 0.43% and 0.32%, respectively, and the glass fibers being 7.9% by weight of the cementitious mixture.

The resultant cementitious mixture was first extruded and then passed between a pair of heated rollers to form a cementitious sheet. The insulating plate had a higher toughness and fracture energy than the plate of Example 1, and had a k-factor of 0.18 W/m.K.

EXAMPLE 3

A plate having good insulation properties was formed from a cementitious mixture containing the following components:

| | |
|---|---|
| Portland White Cement | 4.0 kg |
| Water | 1.179 kg |
| Sodium silicate microspheres | 1.33 kg |
| Tylose ® 15002 | 30 g |
| Cemfill ® glass fibers (4.5 mm; alkali resistant) | 508 g |

The cementitious mixture was made utilizing the procedures set forth with respect to Example 2, except that the microspheres were added in place of the perlite. The resultant cementitious mixture had a water to cement ratio of approximately 0.29, which was dramatically lower than that of Examples 1 and 2. This demonstrates that depending upon the aggregate system, significantly different water to cement ratios can be designed into the composition. The amount of the cement paste (cement and water) in this cementitious mixture was 73.5% by weight, with the microspheres comprising 18.9%, the Tylose® comprising 0.43%, and the glass fibers being 7.2% by weight of the cementitious mixture.

The resulting insulation barrier was lighter than those in Examples 1 or 2. The cementitious mixture could be readily extruded and passed between a pair of rollers to form the cementitious sheet or plate having a k-factor of 0.16 W/m.K.

While mere early prototypes of the present invention, the insulation barriers prepared according to Examples 1–3 taught that the concepts tested therein were sound. Unfortunately, it was learned that highly adequate insulative barriers cannot be obtained merely by adding to the cementitious mixture porous aggregates such as those used in Examples 1–3 above. Neither the addition of perlite, nor the calcium silicate microspheres imparted the degree of insulation desired for commercial insulation use. Therefore, other methods of imparting insulation other than by merely adding inorganic materials to the cement matrix had to be found.

In the next series of examples, microscopic and discontinuous, nonagglomerated air voids were introduced into the cement matrix, greatly increasing the insulative ability of cementitious insulating barriers.

EXAMPLE 4

A plate having good insulation properties was formed from a cementitious mixture containing the following components:

| | |
|---|---|
| Portland White Cement | 2.52 kg |
| Water | 1.975 kg |
| Vermiculite | 1.457 kg |
| Vinsol resin | 2.5 g |
| Tylose ® 4000 | 25 g |
| Tylose ® 15002 | 75 g |
| Abaca fiber | 159 g |

The cementitious mixture was made by prewetting the abaca fiber (which has been pretreated by the manufacturer with sodium hydroxide so that greater than 85% of the cellulose is α-hydroxycellulose) and then adding the excess water and the fibers to the other components except the vermiculite. This mixture was mixed for about 10 minutes, and a further 10 minutes after the vermiculite was added. The resultant cementitious mixture had a water to cement ratio of approximately 0.78. The amount of the cement paste (cement and water) in this cementitious mixture was 72.3% by weight, with the vermiculite comprising 23.4%, the Tylose® 4000 and 15002 comprising 0.40% and 1.21%, respectively, the vinsol resin (an air entraining agent) comprising 0.04%, and the abaca fibers being 2.6% by weight of the cementitious mixture.

The cementitious insulation barrier in this example was molded as above into a rectangular sheet with a wall thickness of about ¼ inch. The resulting cementitious barrier had a k-factor of 0.16 W/m.K. The surface finish was very smooth, and the barrier had a high toughness and fracture energy.

EXAMPLES 5–8

A cementitious insulation barrier was formed by passing through a pair of rollers a cementitious mixture containing glass balls (<1 mm) as the aggregate. The components for each example were as follows:

| Example | Cement | Water | Tylose ® FL 15002 | Glass Balls |
|---|---|---|---|---|
| 5 | 4 kg | 2.18 kg | 200 g | 445 g |
| 6 | 3 kg | 1.85 kg | 150 g | 572 g |
| 7 | 2 kg | 1.57 kg | 100 g | 857 g |
| 8 | 1 kg | 1.55 kg | 100 g | 905 g |

The cementitious mixtures were prepared substantially according to the procedures of Example 4. The resultant cementitious mixtures had water to cement ratios of approximately 0.55, 0.62, 0.79, and 1.58, respectively. Even with the high water to cement ratio of Example 8, the cementitious mixture was form stable in the green state and readily moldable. The percentage by weight of the glass balls in each example was 6.5%, 10.3%, 18.9%, and 25.3%, respectively.

These materials were extremely lightweight, having densities in the range from about 0.25 to 0.5. Equally important were the insulative capabilities of a 2.0 mm thick piece of the resultant materials:

| Example | K-Factor (W/m · K) |
|---|---|
| 5 | 0.27 |
| 6 | 0.24 |
| 7 | 0.16 |
| 8 | 0.07 |

It is believed that the insulating abilities of the insulation barriers of Examples 7 and 8 are even greater than indicated. These products were coated with melamine and the solvent in the melamine may have made the effective thickness much less than 2.0 mm. In fact, these products were placed in an oven at 150° C. for three hours; thereafter, they could be removed by hand. This means that the surface temperature was significantly less than 60° C.

EXAMPLE 9

A relatively high strength cementitious plate was formed for purposes of reinforcing weaker cementitious insulation barriers from a cementitious mixture having the following components:

| | |
|---|---|
| Portland Cement | 2 kg |
| Water | 1 kg |
| Tylose ® 4000 | 60 g |
| Perlite | 0.702 kg |

The cementitious mixture was formed by mixing the cement, water, and Tylose® together in a high speed, high shear mixer for 10 minutes, after which the perlite was mixed in for an additional 5 minutes under low speed mixing conditions. The cementitious mixture was poured into a rectangular mold and made into a plate 1 cm thick. The cured plate had a density of 1.6 g/cm$^3$ and a k-factor of 0.232 W/m.K. Although this plate showed only a modest degree of insulating ability, it had relatively high strength.

EXAMPLE 10

A relatively high strength cementitious plate was formed for purposes of reinforcing weaker cementitious insulation barriers from a cementitious mixture having the following components:

| | |
|---|---|
| Portland Cement | 2 kg |
| Water | 1.645 kg |
| Tylose ® 4000 | 20 g |
| Tylose FL 15002 | 15 g |
| Perlite | 0.645 kg |
| Glass Fiber | 0.508 kg |

The cementitious mixture was formed by mixing the cement, water, Tylose®, and glass fibers together in a high speed, high shear mixer for 10 minutes, after which the perlite was mixed in for an additional 5 minutes under low speed mixing conditions. The cementitious mixture was poured into a rectangular mold and made into a plate 1 cm thick. The cured plate had a density of 1.7 g/cm$^3$ and a k-factor of 0.22 W/m.K. Although this plate showed about the same insulating ability, it had relatively high strength. Because of the inclusion of glass fibers, the insulation barrier of this example had higher fracture energy than the plate of Example 9.

EXAMPLE 11

A cementitious insulation barrier was formed by sandwiching together a lightweight gel between two cementitious layers. The cementitious layers were formed from a cementitious mixture having the following components:

| | |
|---|---|
| Portland Cement | 15 kg |
| Water | 22.5 kg |
| Tylose ® FL 15002 | 0.3 kg |
| Mearlcrete ® | 0.3 kg |
| Abaca Fiber | 0.25 kg |

The components were mixed together in a high speed, high energy mixer for 10 minutes. The Mearlcrete was added to help entrain air within the mixture, while the Tylose® helped to stabilize the entrained air. This created a foamed cementitious mixture having lower density than if non-foamed. The foamed cementitious mixture was made into plates about ¼ inch thick by pouring the foamed mixture into rectangular molds.

An insulation layer 1 cm thick and consisting of clear aerogel was sandwiched between two of the cementitious sheets formed in this example to form a laminate insulation barrier. The layers were held together by contact cement.

The cementitious sheets had a combined thickness of 0.58 inch. The compressive strength of the laminate was determined to be 0.25 MPa. The flexural strength of the laminate was determined to be 0.8 MPa using a 3-point bending test on a 10 cm sample. The laminate had a density of 0.32 g/cm$^3$ and a k-factor of 0.037 W/m.K.

EXAMPLE 12

A cementitious insulation barrier was formed by sandwiching together a lightweight gel between two cementitious layers. The cementitious layers were formed from a cementitious mixture made by taking 2.5 kg of the foamed cementitious mixture of Example 11 and mixing in 1 kg of hollow glass spheres having a maximum diameter of 200 microns under low speed mixing conditions. The resulting cementitious mixture was made into plates having a thickness of about ¼ inch by pouring the mixture into rectangular molds.

An insulation layer 1 cm thick and consisting of aerogel doped with carbon (graphite) to increase the insulative ability was sandwiched between two of the cementitious sheets formed in this example to form a laminate insulation barrier. The layers were held together by contact cement.

The combined thickness of the cementitious layers was 0.67 inch. The resulting laminate had a density of 0.304 g/cm$^3$ and a k-factor of 0.036 W/m.K.

EXAMPLE 13

Cementitious sheets were made substantially according to Example 11, except that only 0.125 kg of abaca fiber was used in this example. An insulation layer consisting of sea gel 0.7 inch thick was sandwiched between two of the cementitious sheets to form a laminate insulation barrier. The cumulative thickness of the cementitious sheets was 0.56 inch. The laminate had a density of 0.213 g/cm$^3$ and a k-factor of 0.051 W/m.K.

EXAMPLE 14

A laminate insulation barrier was formed using the cementitious plates formed in Example 12 and an insulation layer consisting of sea gel. The different layers were glued together using contact cement. The insulation layer had a thickness of 0.7 inch, while the cementitious sheets had a cumulative thickness of 0.67. The laminate had a density of 0.187 g/cm$^3$ and a k-factor of 0.048 W/m.K.

EXAMPLE 15

A laminate insulation barrier was formed substantially according to Example 14, except that the cementitious plates within the laminate had a cumulative thickness of 0.59 inch instead of 0.67 inch as in Example 14. Consequently, because the sea gel made up a larger percentage of the overall mass of the laminate in Example 15 compared to the laminate in Example 14, the former had a lower density and higher insulating ability than the latter.

The compressive strength of the laminate was determined to be 0.06 MPa. The flexural strength of the laminate was determined to be 0.78 MPa using a 3-point bending test on a 10 cm sample. The laminate had a density of 0.165 g/cm$^3$ and a k-factor of 0.042 W/m.K.

EXAMPLE 16

An insulating barrier was formed by molding the foamed cementitious mixture of Example 14 in a rectangular mold. The thickness of the insulating barrier was 1.1 inch, the density was 0.282 g/cm$^3$, and the k-factor was 0.068 W/m.K.

EXAMPLE 17

A noncementitious mixture was made from a mixture which contained the following components:

| | |
|---|---|
| Water | 1.65 kg |
| Tylose ® FL 15002 | 0.2 kg |
| Abaca Fiber | 0.1 kg |
| Hollow Glass Spheres (<200 microns) | 0.905 kg |

The water, Tylose®, and abaca fiber were mixed together in a high speed mixer for 5 minutes, after which the hollow glass spheres were added and mixed for an additional 5 minutes under low speed conditions. The mixture was poured into a rectangular mold and formed into a plate 0.985 inch thick. The density was only 0.154 g/cm$^3$ and the k-factor was 0.045 W/m.K. The plate formed in this example had relatively low strength characteristics but was extremely lightweight due to the lack of cement. This material would be suitable as the more insulating layer attached to one or more cementitious sheets using adhesion means known to those skilled in the art.

EXAMPLE 18

A foamed cementitious mixture was obtained by combining 2 kg of the cementitious mixture obtained in Example 13 with 1 kg of hollow glass spheres (<200 microns). This foamed cementitious mixture containing glass spheres was made into a plate 1.075 inch thick using a rectangular mold. The resulting cementitious plate had a density of 0.228 g/cm$^3$ and a k-factor of 0.065 W/m.K.

EXAMPLE 19

The cementitious mixture obtained in Example 11 was made into a plate 0.935 inch thick using a rectangular mold. The cementitious plate had a density of 0.418 g/cm$^3$ and a k-factor of 0.119 W/m.K.

EXAMPLE 20

A cementitious mixture was made which had the following components:

| | |
|---|---|
| Portland Cement | 15 kg |
| Water | 15 kg |
| Tylose ® FL 15002 | 0.3 kg |
| Surfactant (A0728) | 0.3 kg |
| Abaca Fiber | 0.25 kg |

The components were mixed together using a high energy, high shear mixer for 10 minutes. The surfactant was an amine oxide sold by Exxon as A0728®. Carbon dioxide was incorporated into the cementitious mixture by placing CO$_2$ gas over the surface of the mixture as it was being mixed. Thereafter, 2 kg of this resulting mixture was mixed together with 1 kg of hollow glass spheres (<200 microns) using a low speed mixer. The addition of CO$_2$ was found to increase the foam stability of the mixture, thereby maintaining smaller, more uniformly distributed voids throughout the mixture.

The foamed cementitious mixture with glass spheres was formed into an insulation barrier 0.965 inch thick using a rectangular mold. The density of the barrier was 0.428 g/cm$^3$ and the k-factor was 0.089 W/m.K.

EXAMPLE 21

A cementitious mixture was made which had the following components:

| | |
|---|---|
| Portland Cement | 15 kg |
| Water | 22.5 kg |
| Tylose ® FL 15002 | 0.3 kg |
| Surfactant (A0728) | 0.3 kg |
| Abaca Fiber | 0.25 kg |

The components were mixed together according to the procedure of Example 20. Thereafter, 2.9 kg of this resulting mixture was mixed together with 1 kg of hollow glass spheres (<200 microns) using a low speed mixer. The addition of CO$_2$ was found to increase the foam stability of the mixture, thereby maintaining smaller, more uniformly distributed voids throughout the mixture.

The foamed cementitious mixture with glass spheres was formed into an insulation barrier 1.04 inch thick using a rectangular mold. The density of the barrier was 0.4 g/cm$^3$ and the k-factor was 0.110 W/m.K.

EXAMPLE 22

A cementitious insulation barrier was formed by molding in a rectangular mold a cementitious mixture which had the following components:

| | |
|---|---|
| Portland Cement | 15 kg |
| Water | 22.5 kg |
| Tylose ® FL 15002 | 0.3 kg |
| Surfactant (A0728) | 0.3 kg |
| Abaca Fiber | 0.125 kg |

The components were mixed together according to the procedure of Example 20. The resulting foamed cementitious mixture was immediately molded into an insulation barrier which had a thickness of 0.993 inch, a density of 0.396 g/cm$^3$ and a k-factor of 0.110 W/m.K. The addition of CO$_2$ was found to increase the foam stability of the mixture, thereby maintaining smaller, more uniformly distributed voids throughout the mixture.

EXAMPLES 23–25

The cementitious mixture of Example 21 was formed into insulation barriers having the following characteristics:

| Example | Density (g/cm³) | K-Factor (W/m · K) |
| --- | --- | --- |
| 23 | 0.338 | 0.089 |
| 24 | 0.304 | 0.071 |
| 25 | 0.303 | 0.065 |

The variation in the densities and k-factors can be accounted for by the ability of the cementitious mixture to have greatly varying amounts of entrained air. This could be due to variations in the mixing time or the speed with which the mixtures were mixed.

Tests showed that the insulation barrier made in Example 25 had excellent strength characteristics, with a compressive strength of 1.2 MPa and a tensile strength of 1.7 MPa.

EXAMPLE 26

A cementitious insulation barrier was formed from a cementitious mixture having the following components:

| Portland Cement | 0.5 kg |
| --- | --- |
| Water | 1.65 kg |
| Tylose ® 4000 | 0.05 kg |
| Tylose ® FL 15002 | 0.05 kg |
| Glass Fiber | 0.15 kg |
| Hollow Glass Spheres | 1.0 kg |

The components (except for the hollow glass spheres) were mixed together in a high speed, high shear mixer for about 10 minutes, after which the hollow glass spheres were added and the mixture mixed at low speed for an additional 5 minutes. The resulting mixture was poured into a rectangular mold to form an insulation barrier which was 1.03 inch thick, had a density of 0.137 g/cm³, and a k-factor of 0.040 W/m.K.

EXAMPLE 27

A laminate insulation barrier was formed by sandwiching a ultra lightweight, highly insulating gel material between a pair of cementitious sheets formed from a cementitious mixture having the following components:

| Portland Cement | 10 kg |
| --- | --- |
| Water | 1.8 kg |
| Glass Fiber | 0.35 kg |
| Superplasticizer (WRDA 19) | 0.4 kg |

The components were mixed together using a high speed, high shear mixer for about 6 minutes. Thereafter the cementitious mixture was poured into a mold to form cementitious sheets. The mixture was also alternatively be passed through a pair of rollers to form a flat sheet. The molded sheets were found to have a high compressive strength, namely 150 MPa, making the plate highly ductile and impact resistant.

Aerogel doped with carbon (graphite), which had a thickness of 0.394 inch, was sandwiched between two of the cementitious sheets formed above, the sheets having thicknesses of 0.125 inch and 0.123 inch, respectively. The insulation barrier had a total thickness of 0.642 inch, a density of 1.263 g/cm³ and a k-factor of 0.021 W/m.K.

EXAMPLE 28

A laminate insulation barrier was formed by sandwiching a ultra lightweight, highly insulating gel material between a pair of cementitious sheets formed from a cementitious mixture having the following components:

| Portland Cement | 0.5 kg |
| --- | --- |
| Water | 1.65 kg |
| Tylose ® 4000 | 0.05 kg |
| Tylose ® FL 15002 | 0.05 kg |
| Glass Fiber | 0.15 kg |
| Hollow Glass Spheres | 1.0 kg |

The components (except the hollow glass spheres) were mixed together using a high speed, high shear mixer for about 10 minutes, after which the hollow glass spheres were added and the mixture mixed at low speed for an additional 5 minutes. Thereafter the cementitious mixture was formed into ultra thin sheets by passing the mixture through a pair of rollers.

Aerogel doped with carbon (graphite), which had a thickness of 0.433 inch, was sandwiched between two of the cementitious sheets formed above, the sheets having thicknesses of 0.075 inch and 0.08 inch, respectively. The insulation barrier had a total thickness of 0.588 inch, a density of 0.208 g/cm³ and a k-factor of 0.021 W/m.K. Although the insulation barrier of Example 28 had similar insulation characteristics compared to the barrier of Example 27, the latter was much stronger due to the inclusion of thicker cementitious sheets for structural support.

While the following examples are hypothetical in nature, they are based upon similar mix designs which have either been made, or which were calculated and extrapolated from actual mixes. However, these examples are presented this way in order to more specifically teach those skilled in the art the compositions and methods of the present invention.

EXAMPLES 29–32

The cementitious mixtures of these examples are identical to those of Examples 5–8, except that varying amounts of abaca fiber is added.

| Example | Corresponding Example | Amount of Abaca fiber |
| --- | --- | --- |
| 29 | 5 | 149 g |
| 30 | 6 | 152 g |
| 31 | 7 | 180 g |
| 32 | 8 | 181 g |

The resultant percentage by weight of the abaca fiber in these examples is 2.1%, 2.7%, 3.8%, and 4.8, respectively.

These cementitious materials are as insulative as those of Examples 5–8, but they are much tougher and have a higher fracture energy. Hence, the use of these abaca fiber, as well as other types of fiber, is particularly desirable in situations where such characteristics are desirable.

EXAMPLES 33–35

Rectangular plates composed of cementitious mixtures of these examples are prepared according to the procedures of, and using the components of, Example 5 (i.e., 4 kg of portland white cement is used) with the exceptions that aluminum powder (<100 mesh) and NaOH were added to the cementitious mixtures in the following amounts and the resultant molded plates are heated to about 80° C. for 30–60 minutes:

| Example | Aluminum | NaOH |
|---|---|---|
| 33 | 4 g | 21.9 g |
| 34 | 6 g | 34.7 g |
| 35 | 8 g | 34.7 g |

The NaOH is added to the cementitious mixture to activate the aluminum by establishing a pH in the preferable range of about 13.1–13.8. The result is that the porosity of the cementitious mixture is increased, the bulk density is decreased, and the insulation capability is increased.

It is important to note that shrinkage cracks have not been observed in experiments which have been conducted under conditions which are not dissimilar to those delineated in Examples 33–35, even though the cementitious mixtures are heated and much of the water is driven off rapidly.

EXAMPLES 36–38

Rectangular plates composed of cementitious mixtures of these examples are prepared according to the procedures of, and using the components of, Example 6 (i.e., 3 kg of portland white cement is used) with the exceptions that aluminum powder (<100 mesh) and NaOH is added to the cementitious mixtures in the following amounts:

| Example | Aluminum | NaOH |
|---|---|---|
| 36 | 3 g | 18.6 g |
| 37 | 4.5 g | 29.5 g |
| 38 | 6 g | 29.5 g |

The NaOH is added to the cementitious mixture to activate the aluminum by establishing a pH in the preferable range of about 13.1–13.8. The resultant molded plates are heated to about 80° C. for 30–60 minutes. The result is that the porosity of the cementitious mixture is increased, the bulk density is decreased, and the insulation capability is increased. The plates of Examples 36–38 are lighter and slightly more insulative than those of Examples 33–35.

EXAMPLES 39–41

Rectangular plates composed of cementitious mixtures of these examples are prepared according to the procedures of, and using the components of, Example 7 (i.e., 2 kg of portland white cement is used) with the exceptions that aluminum powder (<100 mesh) and NaOH are added to the cementitious mixtures in the following amounts.

| Example | Aluminum | NaOH |
|---|---|---|
| 39 | 2 g | 15.8 g |
| 40 | 3 g | 25.0 g |
| 41 | 4 g | 25.0 g |

The NaOH is added to the cementitious mixture to activate the aluminum by establishing a pH in the preferable range of about 13.1–13.8. The resultant molded plates are heated to about 80° C. for 30–60 minutes. The result is that the porosity of the cementitious mixture is increased, the bulk density is decreased, and the insulation capability is increased.

The plates of Examples 39–41 are much lighter and have a much greater insulating capability than the plates of Examples 33–38. Nevertheless, the strength of these plates is less that those with a greater concentration of hydraulic cement.

EXAMPLES 42–44

Rectangular plates composed of cementitious mixtures of these examples are prepared according to the procedures of, and using the components of, Example 8 (i.e., 1 kg of portland white cement is used) with the exceptions that aluminum powder (<100 mesh) and NaOH are added to the cementitious mixtures in the following amounts:

| Example | Aluminum | NaOH |
|---|---|---|
| 42 | 1 g | 15.8 g |
| 43 | 1.5 g | 25.1 g |
| 44 | 2 g | 25.1 g |

The NaOH is added to the cementitious mixture to activate the aluminum by establishing a pH in the preferable range of about 13.1–13.8. The resultant molded plates are heated to about 80° C. for 30–60 minutes. The result is that the porosity of the cementitious mixture is increased, the bulk density is decreased, and the insulation capability is increased.

The plates of Examples 42–44 are even lighter and have even greater insulating capability than the plates of Examples 39–41. Again, the less amount of hydraulic cement results in a slightly weaker product.

EXAMPLES 45–47

Cementitious plates are formed by passing through a pair of rollers cementitious mixtures containing the components for each example as follows:

| Example | Aluminum | NaOH |
|---|---|---|
| 45 | 10.0 g | 22.3 g |
| 46 | 15.0 g | 22.3 g |
| 47 | 22.5 g | 22.3 g |

In each of these examples, there is 4 kg of portland white cement, 1.4 kg of water, and 40 g of Tylose® 15002. The cementitious mixtures are prepared substantially according to the procedures of Example 1, with the exception that no aggregates are added. The resultant cementitious mixtures have a water to cement ratios of approximately 0.35. These materials are extremely lightweight and are very insulative because of the amount of air incorporated into the mixtures.

EXAMPLES 48–50

Cementitious plates are formed by passing through a pair of rollers cementitious mixtures containing the components for each example as follows:

| Example | Aluminum | NaOH | Abaca Fibers |
|---|---|---|---|
| 48 | 10.0 g | 22.3 g | 60 g |
| 49 | 15.0 g | 22.3 g | 60 g |
| 50 | 22.5 g | 22.3 g | 60 g |

In each of these examples, there is 4 kg of portland white cement, 1.4 kg of water, and 40 g of Tylose® 15002. The cementitious mixtures are prepared substantially according to the procedures of Example 1, with the exception that fibers rather than perlite aggregates are added. Like the cementitious mixtures of Examples 45–47, these materials are extremely lightweight and are very insulative because of the amount of air incorporated into the mixtures. However, the cementitious mixtures of these examples have increased toughness and fracture energy because of the addition of the fibers.

EXAMPLE 51

Any of the cementitious materials described in any of the previous examples are broken up into fragments. Such fragments can be used as loose fill insulation. In addition, they can be reincorporated into other cementitious mixtures and molded or formed into new cementitious insulation barriers.

EXAMPLE 52

Any of the cementitious mixtures used in any previous example is formed into the shape of pellets. Such cementitious pellets can be used as loose fill insulation. In addition, they can be reincorporated into other cementitious mixtures and molded or formed into new cementitious insulation barriers.

EXAMPLE 53

Any of the cementitious mixtures used in any previous example is formed into the shape of an insulative liner. This liner is generally the shape of a container into which it can be placed to make the container more insulative, such as an ice cooler, refrigerator, partition, jug, pitcher, cup, plate, encasement, pipe, duct, or compartment.

EXAMPLE 54

Any of the cementitious mixtures used in any previous example is formed into the shape of an insulative container. The container might be in the shape of an ice cooler, refrigerator, partition, jug, pitcher, cup, plate, encasement, pipe, duct, or compartment.

EXAMPLE 55

A highly insulating laminate insulation barrier is formed by first placing hollow glass spheres within a mold. The diameters of the glass spheres are chosen to optimize the packing ability of the spheres within the mold so that the glass spheres occupy 70% of the volume within the mold. A highly thixotropic cementitious mixture containing cement, water, fibers, a superplasticizer water reducing additive (WRDA 19, a sulfonated naphthalene-formaldehyde condensate), and a rheology modifying agent (Tylose®) is placed into the mold through an opening in the top, and the mold and the contents therein are subjected to strong, vibration and/or pressure. The vibration and/or pressure causes the thixotropic cementitious mixture to temporarily become less viscous, increasing the ability of the mixture to flow into the spaces between the individual aggregate particles.

When the material within the mold has reached sufficient form stability, it is removed from the mold, after which one or more sides of the molded material is laminated with a relatively thin layer of the cementitious material described in Example 11.

The molded layer containing the hollow glass spheres provides the bulk of the insulation ability of the laminate, while the layer of stronger cementitious material containing abaca fibers provides structural support. The result is a highly insulative laminate with a k-factor of at least 0.06 W/m.K.

Where the average diameter of the individual glass spheres is relatively high, the final product can be made stronger by adding a fine aggregate material to the cementitious mixture, such as fine sand, quartz, or silica.

EXAMPLE 56

A laminate insulation barrier is manufactured substantially according to the method set forth in Example 55, except that the diameters of the hollow glass spheres are optimized so that the spheres occupy 80% of the volume within the mold. The result is a highly insulative laminate with a k-factor of at least 0.05 W/m.K.

EXAMPLE 57

A laminate insulation barrier is manufactured substantially according to the method set forth in Example 55, except that the diameters of the hollow glass spheres are optimized so that the spheres occupy 90% of the volume within the mold. The result is a highly insulative laminate with a k-factor of at least 0.04 W/m.K.

EXAMPLE 58

A laminate insulation barrier is manufactured substantially according to the method set forth in Example 55, except that the diameters of the hollow glass spheres are optimized so that the spheres occupy 95% of the volume within the mold. The result is a highly insulative laminate with a k-factor of at least 0.035 W/m.K.

EXAMPLE 59

A laminate insulation barrier is manufactured substantially according to the method set forth in Example 55, except that perlite particles having varying diameters are substituted for the hollow glass spheres. The result is a highly insulative laminate with a k-factor of at least 0.06 W/m.K.

Where the average diameter of the individual perlite particles is relatively high, the final product can be made stronger by adding a fine aggregate material to the cementitious mixture, such as fine sand, quartz, or silica.

EXAMPLE 60

A laminate insulation barrier is manufactured substantially according to the method set forth in Example 55, except that the diameters of the perlite particles are optimized so that they occupy 80% of the volume within the mold. The result is a highly insulative laminate with a k-factor of at least 0.05 W/m.K.

EXAMPLE 61

A laminate insulation barrier is manufactured substantially according to the method set forth in Example 55, except that the diameters of the perlite particles are optimized so that they occupy 90% of the volume within the mold. The result is a highly insulative laminate with a k-factor of at least 0.04 W/m.K.

EXAMPLE 62

A laminate insulation barrier is manufactured substantially according to the method set forth in Example 55, except that the diameters of the perlite particles are optimized so that they occupy 95% of the volume within the mold. The result is a highly insulative laminate with a k-factor of at least 0.035 W/m.K.

EXAMPLE 63

A laminate insulation barrier is manufactured substantially according to the method set forth in Example 55, except that a mixture of hollow glass spheres and perlite particles having varying diameters are substituted for the hollow glass spheres. The result is a highly insulative laminate with a k-factor of at least 0.06 W/m.K.

EXAMPLE 64

A laminate insulation barrier is manufactured substantially according to the method set forth in Example 55, except that vermiculite particles having varying diameters are substituted for the hollow glass spheres. The result is a highly insulative laminate with a k-factor of at least 0.06 W/m.K.

EXAMPLE 65

A laminate insulation barrier is manufactured substantially according to the method set forth in Example 55, except that diatomaceous earth particles having varying diameters are substituted for the hollow glass spheres. The result is a highly insulative laminate with a k-factor of at least 0.06 W/m.K.

EXAMPLE 66

A laminate insulation barrier is manufactured substantially according to the method set forth in Example 55, except that fibers are placed in the dry mold together with the hollow glass spheres. The result is a highly insulative laminate with a k-factor of at least 0.06 W/m.K.

IV. Summary.

From the foregoing, it will be appreciated that the present invention provides novel compositions and processes for cementitious insulation barriers useful in any application where high insulation at low cost is desired, particularly in the construction industry, or in the manufacture of appliances.

The present invention also provides novel compositions and processes for cementitious insulation barriers which have insulating and other properties comparable to that of polystyrene foam or other organic insulation materials, but which are more environmentally neutral. Specifically, the present invention does not require the use of, or emit, chemicals which have been implicated as causing depletion of the ozone layer, nor does it create unsightly garbage which does not degrade, or which only very slowly degrades over time in landfills.

In addition, the present invention also provides novel compositions and processes for cementitious insulation barriers which can be produced at costs that are comparable or lower than those of conventional insulation materials.

Further, the present invention provides novel compositions and processes for cementitious insulation barriers which are much more environmentally sound if ever disposed of than other insulation materials, such as asbestos, UFFI, or styrofoam. The present invention provides novel compositions and processes for cementitious insulation barriers which are essentially comprised of the same compounds as the earth, and are similar to dirt and rock, and therefore pose little or no risk to the environment if discarded into landfills.

The present invention further provides novel compositions and processes for which the raw materials may be obtained from the earth, eliminating the need to further deplete the already dwindling petroleum reserves in order to obtain the parent materials as is required for the manufacture of many insulation products, particularly blown organic foams like polystyrene or UFFI.

The present invention further provides novel compositions and processes for improving the safety of insulation barriers within buildings, in that the cementitious insulation barriers do not release harmful chemicals like formaldehyde into the building in which the insulation was placed.

The present invention further provides novel compositions and processes for improving the recyclability of insulation materials, particularly since the cementitious materials can be reintroduced into new cement paste as an aggregate, or be incorporated as a suitable aggregate in many other cement applications.

The present invention further provides novel compositions and processes for achieving lightweight and insulative wallboards which still have sufficient structural, flexural, and tensile strengths, like gypsum board.

The present invention further provides novel cementitious insulation barriers which will maintain their shape without external support during the green state and rapidly achieve sufficient strength so that the molded barriers can be handled using ordinary methods.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An insulation barrier formed from a cementitious mixture comprising a hydraulic cement selected from the group consisting of portland cement, slag cement, calcium aluminate cement, silicate cement, phosphate cement, high-alumina cement, and magnesium oxychloride cement, water, and a rheology-modifying agent in an initial concentration such that the cementitious mixture has a rheology and early green strength during formation of the insulation barrier such that the insulation barrier is form stable within a period of time less than about 10 minutes after being positioned into a desired shape, the insulation barrier first achieving form stability while still in a green and moldable state, the insulation barrier having a density less than about 1 g/cm$^3$ and a maximum thermal conductivity of about 0.06 W/m.K.

2. An insulation barrier as defined in claim 1, wherein the cementitious mixture includes a lightweight aggregate material.

3. An insulation barrier as defined in claim 2, wherein the lightweight aggregate material includes individual particles which have varying diameters in order to optimize the particle packing density of the lightweight aggregate material within the cementitious mixture.

4. An insulation barrier as defined in claim 3, wherein the lightweight aggregate material comprises at least about 70% of the total volume of the insulation barrier.

5. An insulation barrier as defined in claim 3, wherein the lightweight aggregate material comprises at least about 80% of the total volume of the insulation barrier.

6. An insulation barrier as defined in claim 3, wherein the lightweight aggregate material comprises at least about 90% of the total volume of the insulation barrier.

7. An insulation barrier as defined in claim 3, wherein the lightweight aggregate material comprises at least about 95% of the total volume of the insulation barrier.

8. An insulation barrier as defined in claim 2, wherein the lightweight aggregate material is included in an amount up to about 60% by weight of the cementitious mixture.

9. An insulation barrier as defined in claim 2, wherein the lightweight aggregate material is included in an amount in a range from about 3% to about 50% by weight of the cementitious mixture.

10. An insulation barrier as defined in claim 2, wherein the lightweight aggregate material is included in an amount in a range from about 20% to about 35% by weight of the cementitious mixture.

11. An insulation barrier as defined in claim 2, wherein the lightweight aggregate material is selected from the group consisting of vermiculite, exfoliated rock, expanded clay, organic polymers, pumice, and mixtures or derivatives thereof.

12. An insulation barrier as defined in claim 2, wherein the lightweight aggregate material is selected from the group consisting of aerogel and aerogel doped with an insulation increasing material.

13. An insulation barrier as defined in claim 12, wherein the insulation increasing material includes carbon.

14. An insulation barrier as defined in claim 2, wherein the lightweight aggregate material includes perlite.

15. An insulation barrier as defined in claim 2, wherein the lightweight aggregate material includes hollow glass spheres.

16. An insulation barrier as defined in claim 2, wherein the lightweight aggregate material includes calcium silicate macrospheres.

17. An insulation barrier as defined in claim 2, wherein the lightweight aggregate material includes plastic spheres.

18. An insulation barrier as defined in claim 2, wherein the lightweight aggregate material includes xerogel.

19. An insulation barrier as defined in claim 2, wherein the lightweight aggregate material includes sea gel.

20. An insulation barrier as defined in claim 2, wherein the lightweight aggregate material includes xonotlite.

21. An insulation barrier as defined in claim 1, wherein the cementitious mixture further includes an aggregate material having a high density.

22. An insulation barrier as defined in claim 21, wherein the aggregate material having a relatively high density is selected from the group consisting of sand, glass, gravel, rock, limestone, sandstone, calcium carbonate, metals, ceramic, alumina, and mixtures or derivatives thereof.

23. An insulation barrier as defined in claim 1, wherein the cementitious mixture includes a fibrous material.

24. An insulation barrier as defined in claim 23, wherein the fibrous material increases the strength of the cementitious structural matrix.

25. An insulation barrier as defined in claim 23, wherein the fibrous material is selected from the group consisting of wood fiber, paper fiber, glass fiber, rock wool, carbon fiber, metal fiber, polymer fiber, and mixtures thereof.

26. An insulation barrier as defined in claim 23, wherein the fibrous material includes abaca fiber.

27. An insulation barrier as defined in claim 23, wherein the fibrous material is included in an amount in a range from about 0.5% to about 20% by volume of the cementitious mixture.

28. An insulation barrier as defined in claim 23, wherein the fibrous material is included in an amount in a range from about 1% to about 6% by volume of the cementitious mixture.

29. An insulation barrier as defined in claim 23, wherein the fibrous material includes individual fibers having an aspect ratio of at least about 10:1.

30. An insulation barrier as defined in claim 23, wherein the fibrous material includes individual fibers having an aspect ratio of at least about 100:1.

31. An insulation barrier as defined in claim 23, wherein the fibrous material decreases the thermal conductivity of the insulation barrier.

32. An insulation barrier as defined in claim 1, wherein the rheology-modifying agent comprises a polysaccharide material or a derivative thereof.

33. An insulation barrier as defined in claim 32, wherein the polysaccharide material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

34. An insulation barrier as defined in claim 32, wherein the polysaccharide material is selected from the group consisting of amylopectin, amylose, sea gel, starch acetates, starch hydroxyethyl ethers, ionic starches, long-chain alkylstarches, dextrins, amine starches, phosphate starches, dialdehyde starches, and mixtures or derivatives thereof.

35. An insulation barrier as defined in claim 1, wherein the rheology-modifying agent comprises a protein material.

36. An insulation barrier as defined in claim 35, wherein the protein material is selected from the group consisting of prolamine, collagen derivatives, gelatin, glue, casein, and mixtures or derivatives thereof.

37. An insulation barrier as defined in claim 1, wherein the rheology-modifying agent comprises a synthetic organic material.

38. An insulation barrier as defined in claim 37, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, and mixtures or derivatives thereof.

39. An insulation barrier as defined in claim 1, wherein the rheology-modifying agent comprises a latex.

40. An insulation barrier as defined in claim 1, wherein the rheology-modifying agent is included in an amount in a range from about 0.2% to about 5% by weight of the cementitious mixture.

41. An insulation barrier as defined in claim 1, wherein said rheology-modifying agent is included in an amount in a range from about 0.3% to about 3.0% by weight of the cementitious mixture.

42. An insulation barrier as defined in claim 1, wherein said rheology-modifying agent is included in an amount in a range from about 0.5% to about 1.5% by weight of the cementitious mixture.

43. An insulation barrier as defined in claim 1, further including an insulating material separate from the insulation barrier.

44. An insulation barrier as defined in claim 1, wherein the cementitious mixture includes a superplasticizer.

45. An insulation barrier as defined in claim 44, wherein the superplasticizer includes sulfonated naphthalene-formaldehyde condensate.

46. An insulation barrier as defined in claim 44, wherein the superplasticizer is selected from the group consisting of sulfonated melamine-formaldehyde condensate, lignosulfonate, acrylic acid, and mixtures thereof.

47. An insulation barrier as defined in claim 44, wherein the superplasticizer is included in an amount up to 5% by weight of the hydraulic cement.

48. An insulation barrier as defined in claim 44, wherein the superplasticizer is included in an amount in a range from about 0.25% to about 4% by weight of the hydraulic cement.

49. An insulation barrier as defined in claim 44, wherein the superplasticizer is included in an amount in a range from about 0.5% to about 2.5% by weight of the hydraulic cement.

50. An insulation barrier as defined in claim 1, wherein the cementitious mixture comprises means for creating discontinuous voids within the cementitious mixture.

51. An insulation barrier as defined in claim 1, wherein the cementitious mixture includes a readily oxidizable metal for creating discontinuous voids within the cementitious mixture.

52. An insulation barrier as defined in claim 51, wherein the readily oxidizable metal is selected from the group consisting of tin, aluminum, magnesium, zinc, and mixtures thereof.

53. An insulation barrier as defined in claim 51, the cementitious mixture including a base which accelerates the oxidation of the readily oxidizable metal.

54. An insulation barrier as defined in claim 1, wherein the cementitious mixture comprises an air entrainment agent for creating discontinuous voids within the cementitious mixture.

55. An insulation barrier as defined in claim 54, wherein the air entrainment agent comprises a surfactant.

56. An insulation barrier as defined in claim 1, wherein the insulation barrier comprises a lightweight cementitious material.

57. An insulation barrier as defined in claim 1, wherein the hydraulic cement is included in an amount in a range from about 5% to about 90% by weight of the cementitious mixture.

58. An insulation barrier as defined in claim 1, wherein the hydraulic cement is included in an amount in a range from about 15% to about 75% by weight of the cementitious mixture.

59. An insulation barrier as defined in claim 1, wherein the hydraulic cement is included in an amount in a range from about 20% to about 65% by weight of the cementitious mixture.

60. An insulation barrier as defined in claim 1, wherein the water is included in an amount to result in a water to cement ratio in a range from about 0.3:1 to about 2:1 by weight of the cementitious mixture.

61. An insulation barrier as defined in claim 1, wherein the water is included in an amount to result in a water to cement ratio in a range from about 0.6:1 to about 1:1 by weight of the cementitious mixture.

62. An insulation barrier as defined in claim 1, wherein the insulation barrier has a thermal conductivity less than about 0.05 W/m.K.

63. An insulation barrier as defined in claim 1, wherein the insulation barrier has a thermal conductivity less than about 0.04 W/m.K.

64. An insulation barrier as defined in claim 1, wherein the insulation barrier has a thermal conductivity less than about 0.03 W/m.K.

65. An insulation barrier as defined in claim 1, wherein the insulation barrier has a thermal conductivity less than about 0.02 W/m.K.

66. An insulation barrier as defined in claim 1, wherein the insulation barrier further includes a high density cementitious material.

67. An insulation barrier as defined in claim 1, wherein at least a portion of the insulation barrier comprises a lightweight cementitious material and at least a portion of the insulation comprises a high density cementitious material.

68. An insulation barrier as defined in claim 67, wherein the high density cementitious material provides a substantial portion of the structural strength of the insulation barrier.

69. An insulation barrier as defined in claim 67, wherein the lightweight cementitious material provides a substantial portion of the insulative quality of the insulation barrier.

70. An insulation barrier as defined in claim 67, wherein the insulation barrier has a thermal conductivity less than about 0.05 W/m.K.

71. An insulation barrier as defined in claim 1, wherein the insulation barrier comprises a lightweight cementitious material which imparts a substantial portion of the insulative quality of said insulation barrier, the insulation barrier further including a noncementitious material apart from the lightweight cementitious material which material imparts a substantial portion of the structural strength of the insulation barrier.

72. An insulation barrier as defined in claim 71, wherein the noncementitious material is selected from the group consisting of metal, foil, paper, plastic, organic fabric, fiber glass fabric, wood, ceramic, and combinations thereof.

73. An insulation barrier as defined in claim 1, wherein the insulation barrier comprises cementitious pellets.

74. An insulation barrier as defined in claim 73, wherein the cementitious pellets are enclosed within a container.

75. An insulation barrier as defined in claim 73, wherein the cementitious pellets are encapsulated within a flexible material.

76. An insulation barrier as defined in claim 75, wherein the flexible material is selected from the group consisting of plastic, paper, foil, organic fabric, fiber glass fabric, and combinations thereof.

77. An insulation barrier as defined in claim 1, the insulation barrier further including a noncementitious insulating material attached thereto which further increases the insulation quality of the insulation barrier.

78. An insulation barrier as defined in claim 77, wherein the noncementitious layer is selected from the group consisting of urea-formaldehyde foam, polystyrene foam, fiber glass, rock wool, cellulose, wood pulp, polyisocyanate, asbestos, polyurethane, xerogel, sea gel, and mixtures, combinations, or derivatives thereof.

79. An insulation barrier as defined in claim 77, wherein the noncementitious layer is selected from the group consisting of aerogel and aerogel doped with carbon.

80. An insulation barrier as defined in claim 77, wherein the noncementitious layer is a "foam-type" material comprising a polysaccharide bound structural matrix formed by removing a substantial quantity of water from a hydrated mixture comprising water, a polysaccharide binder, means for incorporating discontinuous air voids within the hydrated mixture and the resulting polysaccharide bound structural matrix, and a lightweight aggregate material.

81. An insulation barrier as defined in claim 80, wherein the polysaccharide binder comprises methylhydroxyethylcellulose.

82. An insulation barrier as defined in claim 1, wherein the insulation barrier is capable of being wrapped around an object.

83. An insulation barrier as defined in claim 82, wherein the insulation barrier comprises a cementitious structural matrix which is flexible in the green state but which will maintain its shape when cured.

84. An insulation barrier as defined in claim 83, wherein the insulation barrier may be wrapped around a pipe, heater duct, air conditioning duct, refrigeration tubing, or the outside of a building.

85. An insulation barrier as defined in claim 1, wherein the insulation barrier conforms to the shape of a container.

86. An insulation barrier as defined in claim 85, wherein the insulation barrier comprises an inner liner of a container.

87. An insulation barrier as defined in claim 85, wherein the insulation barrier comprises an outer liner of a container.

88. An insulation barrier as defined in claim 1, wherein the insulation barrier comprises a partition within a container.

89. An insulation barrier as defined in claim 85, wherein the insulation barrier is capable of providing insulation for a container selected from the group consisting of an ice cooler, refrigerator, partition, jug, pitcher, cup, plate, encasement, pipe, duct, and compartment.

90. An insulation barrier as defined in claim 1, the insulation barrier being able to be molded in a form and used to insulate an object after being cured.

91. An insulation barrier as defined in claim 1, wherein the cementitious mixture comprises a foamed mixture which can be injected into a space before the hydraulic cement and water have substantially reacted in order to form a hardened cementitious structural matrix.

92. An insulation barrier as defined in claim 1, wherein the cementitious mixture comprises a foamed mixture which can be injected into a space between two walls of a building before the hydraulic cement and water have substantially reacted in order to form a hardened cementitious structural matrix.

93. An insulation barrier as defined in claim 1, wherein the hydraulic cement comprises a microfine cement.

94. An insulation barrier as defined in claim 1, wherein the density of the insulation barrier is in a range from about 0.1 g/cm$^3$ to about 1 g/cm$^3$.

95. An insulation barrier as defined in claim 1, wherein the density of the insulation barrier is less than about 0.5 g/cm$^3$.

96. An insulation barrier as defined in claim 1, wherein the density of the insulation barrier is less than about 0.25 g/cm$^3$.

97. An insulation barrier as defined in claim 32, wherein the polysaccharide material is selected from the group consisting of alginic acid, phycocolloids, agar, gum arabic, guar gum, locust bean gum, gum karaya, gum tragacanth, and mixtures or derivatives thereof.

98. An insulation barrier as defined in claim 1, comprising a coating material on at least one side of the insulation barrier which provides a substantial portion of the structural strength of the insulation barrier.

99. An insulation barrier as defined in claim 1, comprising a coating material on at least one side of the insulation barrier thereby rendering that side resistant to penetration by water.

100. An insulation barrier as defined in claim 99, wherein the coating material is selected from the group consisting of plastic, melamine, polyvinyl chloride, polyvinyl alcohol, polyvinyl acetate, sodium silicate, calcium carbonate, polyacrylate, and mixtures or derivatives thereof.

101. An insulation barrier as defined in claim 1, wherein the insulation barrier is form stable within a period of time less than about 1 minute after being positioned into a desired shape.

102. An insulation barrier as defined in claim 1, wherein the insulation barrier is form stable within a period of time less than about 10 seconds after being positioned into a desired shape.

103. An insulation barrier as defined in claim 1, wherein the insulation barrier is form stable immediately after being positioned into a desired shape.

104. An insulation barrier formed from a cementitious mixture comprising a hydraulic cement selected from the group consisting of portland cement, slag cement, calcium aluminate cement, silicate cement, phosphate cement, high-alumina cement, and magnesium oxychloride cement, water, a rheology-modifying agent, and an aggregate material, the cementitious mixture having a rheology and early green strength during formation of the insulation barrier such that the insulation barrier is form stable through the removal of water while still in a green and moldable state within a period of time less than about 10 minutes after being positioned into a desired shape of the insulation barrier, the insulation barrier having a density less than about 1 g/cm$^3$ and a maximum thermal conductivity of about 0.06 W/m.K.

105. An insulation barrier as defined in claim 104, wherein the cementitious mixture includes a fibrous material.

106. An insulation barrier formed from a cementitious mixture comprising a hydraulic cement selected from the group consisting of portland cement, slag cement, calcium aluminate cement, silicate cement, phosphate cement, high-alumina cement, and magnesium oxychloride cement, water, a rheology-modifying agent, and a lightweight aggregate material, the cementitious mixture having a rheology and early green strength during formation of the insulation barrier such that the insulation barrier is form stable while still in a green and moldable state in less than about 10 minutes after being positioned into a desired shape of the insulation barrier, the insulation barrier having a density less than about 1 g/cm$^3$ and a thermal conductivity less than about 0.05 W/m.k.

107. An insulation barrier as defined in claim 106, wherein the cementitious mixture further includes a fibrous material.

\* \* \* \* \*

UNITED STATES PATENT AND TRADEMARK OFFICE
CERTIFICATE OF CORRECTION

PATENT NO. : 5,641,584

DATED : June 24, 1997

INVENTOR(S) : Per Just Andersen; Simon K. Hodson

It is certified that error appears in the above-identified patent and that said Letters Patent is hereby corrected as shown below:

On the title page item [56], under other Publications

Page 4, left column, line 40, "Anderson" should be --Andersen--

Page 5, left column, line 40, "marilyn" should be --Marilyn--

Page 5, left column, line 42, "reeze" should be --Freeze--

Page 6, left column, line 43, "concretes" should be --Concretes--

Page 6, left column, line 44, "Mrs." should be --MRS--

Col. 1, line 5, "this" should be --This--

Col 1, line 8, "continuation in-part" should be --continuation-in-part--

Col. 14, line 57, "sometime" should be --sometimes--

Col. 17, line 13, "preferabl" should be --preferably--

Col. 20, line 35, "act create" should be --act to create--

Col. 24, line 2, "theology" should be --rheology--

Col. 25, line 49, "materials having with" should be --materials, with--

Col. 26, line 51, "mixture" should be --mixtures--

Col. 37, line 54, "alternatively be passed" should be --alternatively passed--

UNITED STATES PATENT AND TRADEMARK OFFICE
CERTIFICATE OF CORRECTION

PATENT NO. : 5,641,584

DATED : June 24, 1997

INVENTOR(S) : Per Just Andersen; Simon K. Hodson

It is certified that error appears in the above-identified patent and that said Letters Patent is hereby corrected as shown below:

Col. 38, line 54, "of these abaca" should be --of abaca--

Signed and Sealed this

Thirty-first Day of March, 1998

Attest:

BRUCE LEHMAN

Attesting Officer     Commissioner of Patents and Trademarks